(12) United States Patent
Pedersen

(10) Patent No.: US 12,352,156 B2
(45) Date of Patent: *Jul. 8, 2025

(54) PLUG, SYSTEM AND METHOD FOR TESTING THE INTEGRITY OF A WELL BARRIER

(71) Applicant: Exedra AS, Stavanger (NO)

(72) Inventor: Bernt Reinhardt Pedersen, Stavanger (NO)

(73) Assignee: Exedra AS, Stavanger (NO)

( * ) Notice: Subject to any disclaimer, the term of this patent is extended or adjusted under 35 U.S.C. 154(b) by 0 days.

This patent is subject to a terminal disclaimer.

(21) Appl. No.: 18/214,352

(22) Filed: Jun. 26, 2023

(65) Prior Publication Data

US 2023/0358134 A1 Nov. 9, 2023

Related U.S. Application Data

(63) Continuation of application No. 16/473,433, filed as application No. PCT/NO2018/050003 on Jan. 5, 2018, now Pat. No. 11,725,501.

(30) Foreign Application Priority Data

| Jan. 6, 2017 | (NO) | .................................. | 20170026 |
| Feb. 21, 2017 | (NO) | .................................. | 20170248 |
| Jun. 23, 2017 | (NO) | .................................. | 20171031 |

(51) Int. Cl.
  *E21B 47/11* (2012.01)
  *E21B 21/01* (2006.01)
  (Continued)

(52) U.S. Cl.
  CPC ............ *E21B 47/111* (2020.05); *E21B 21/01* (2013.01); *E21B 21/065* (2013.01); *E21B 33/12* (2013.01); *E21B 47/11* (2020.05); *G01M 3/02* (2013.01)

(58) Field of Classification Search
  CPC .......... G01M 3/02; E21B 47/41; E21B 47/11; E21B 21/01; E21B 21/065; E21B 33/12
  (Continued)

(56) References Cited

U.S. PATENT DOCUMENTS

| 2,932,741 A | 4/1960 | McKay |
| 4,224,988 A | 9/1980 | Gibson et al. |

(Continued)

FOREIGN PATENT DOCUMENTS

| WO | 2001/025594 | 4/2001 |
| WO | 2002/081861 | 10/2002 |

(Continued)

OTHER PUBLICATIONS

Norwegian Search Report, Norwegian U.S. Appl. No. 20/170,026, date of report Jul. 21, 2017.

(Continued)

*Primary Examiner* — Peter J Macchiarolo
*Assistant Examiner* — Rodney T Frank
(74) *Attorney, Agent, or Firm* — Andrus Intellectual Property Law, LLP

(57) ABSTRACT

A system for testing of leaking past a well barrier. The system includes a well including a wellbore and a upper wellbore termination means. A barrier is provided in the wellbore, the barrier having an upstream side below the barrier and a downstream side above the barrier. The system further includes a tracer and a storage means for storing said tracer, the storage means being provided below the barrier in the well. A release mechanism is configured for releasing the tracer from the storage means, wherein a pressure differential is established across the barrier for driving tracer from the upstream side to the downstream side of the barrier. A detector is configured for detecting the tracer that has leaked through the barrier, the detector being provided in the (Continued)

wellbore between said barrier and said upper wellbore termination means.

20 Claims, 16 Drawing Sheets

(51) Int. Cl.
*E21B 21/06* (2006.01)
*E21B 33/12* (2006.01)
*G01M 3/02* (2006.01)

(58) Field of Classification Search
USPC ........................................ 73/152.41
See application file for complete search history.

(56) References Cited

U.S. PATENT DOCUMENTS

| | | | | |
|---|---|---|---|---|
| 4,353,249 | A | | 10/1982 | Agus et al. |
| 5,237,856 | A | * | 8/1993 | Peake .................. G01M 3/10 73/45.5 |
| 2011/0277996 | A1 | * | 11/2011 | Cullick .................. E21B 43/16 166/250.12 |
| 2014/0318770 | A1 | | 10/2014 | Hallundbaek et al. |
| 2015/0159480 | A1 | | 6/2015 | Kalyanaraman et al. |
| 2016/0097274 | A1 | | 4/2016 | Duphorne et al. |

FOREIGN PATENT DOCUMENTS

| | | | |
|---|---|---|---|
| WO | 2012/096580 | 7/2012 | |
| WO | 2013/135583 | 9/2013 | |
| WO | 2016/196253 | 12/2016 | |
| WO | 2016/200266 | 12/2016 | |
| WO | WO-2016196253 A1 * | 12/2016 | |
| WO | WO-2016200266 A1 * | 12/2016 | ............. E21B 33/12 |

OTHER PUBLICATIONS

Norwegian Search Report, Norwegian U.S. Appl. No. 20/170,248, date of report Sep. 21, 2017.
Norwegian Search Report, Norwegian U.S. Appl. No. 20/174,031, date of report Nov. 6, 2017.
International Search Report, PCT/NO2018/050003, date of mailing Mar. 5, 2018.
Written Opinion, PCT/NO2018/050003, date of mailing Mar. 5, 2018, and Reply filed Nov. 6, 2018.
Written Opinion, PCT/NO2018/050003, date of mailing Dec. 17, 2018 and Reply filed Feb. 15, 2019.
International Preliminary Report on Patentability, PCT/NO2018/050003, date of mailing Mar. 6, 2019.

* cited by examiner

PLUG, SYSTEM AND METHOD FOR TESTING THE INTEGRITY OF A WELL BARRIER

CROSS-REFERENCE TO RELATED APPLICATIONS

This application is a continuation application of U.S. patent Ser. No. 16/473,433, filed Jun. 25, 2019, which is a national stage application of International Application PCT/NO2018/050003, filed Jan. 5, 2018, which international application was published on Jul. 12, 2018, as International Publication WO 2018/128549 in the English language. The International Application claims priority of Norwegian Patent Application No. 20170026, filed Jan. 6, 2017; Norwegian Patent Application No. 20170248, filed Feb. 21, 2017; and Norwegian Patent Application No. 20171931, filed Jun. 23, 2017. The international application and Norwegian applications are all incorporated herein by reference, in their entirety.

FIELD

The present disclosure relates to a plug and system for testing the integrity of a well barrier. More particularly the disclosure relates to a plug and a system for testing the integrity of a well barrier by means of a tracer being released in the well. The disclosure also relates to a method for testing the integrity of a well barrier by means of such a plug and such a system.

BACKGROUND

In the oil and gas industry, safety is always a major concern. Incidents may have severe consequences, such as witnessed in the aftermath of the Deepwater Horizon catastrophe. To prevent such incidents, barriers placed in wells play a leading role. The well barriers are installed mainly to control fluid flow in the well, and ultimately to prevent a blowout, i.e. an uncontrolled release of formation fluids out of the well after the pressure control system, including one or more barriers, has failed.

A barrier set in a well may be said to have two sides: an uphole side and a downhole side. The purpose of the barrier is typically to prevent fluids from moving from the downhole side of the barrier and to the uphole side of the barrier. Thus, the downhole side can be said to be upstream the barrier and the uphole side to be downstream the barrier.

Herein, all references to "above" and "below" a barrier should be construed as closest to surface and closest to the bottom of the well, respectively.

To ensure that a set barrier is able to withstand a given pressure, it is required to test the integrity of the barrier. Standards, such as NORSOK D-010 relating to well integrity in drilling and well operations, contain detailed requirements for testing of well barriers such as cement-based and mechanical plugs. NORSOK D-010 specifies that barriers should be tested in the direction of potential flow, i.e. an upstream test. However, in the industry cement plugs are typically tested from above as no reliable technique currently exists to effectively test them from below. A successful pressure test of a barrier from above, i.e. in the direction opposite to normal flow, does not necessarily indicate that the barrier would withstand the pressure from below. Pressure tests from above have also occasionally been shown to damage casing and other equipment in the well above the barrier.

For cement plugs set in open holes, i.e. non-cased wellbores, tagging from above is normally assumed as the only reliable test of the cement plug. Tagging implies mechanically pushing the cement plug from above by means of a drill string or coiled tubing, thus requiring a rig for carrying out the testing.

Attempts have been made to pressure test barriers from below. However, it has been shown to be challenging to localize any detected leak, as it is more or less impossible to verify whether the leak is due to a compromised barrier, or if the source of the leak is another compromised feature in the well, such as another barrier, a casing connection, a valve, a wellhead etc. Further, it can also be challenging to transmit measured pressure data from below and to above the barrier. Any wired transfer across the barrier will in itself be a channel which constitutes a potential leak source. Finally, the sensitivity of such a pressure test, either from below or above the barrier, is often limited, and small leaks, which may be indicative of a comprised barrier, may be impossible to detect.

In WO 2016/196253 some of the above-mentioned problems are solved by means of a disclosed leak detection system using a tracer gas that is released from below a barrier/plug in the well and a tracer gas detector provided at the wellhead. However, this solution has several drawbacks, in particular when there is no circulation in the well. The distance from the barrier in the well and to the wellhead may be several thousand meters, which in itself creates a delay in sensing any gas that has leaked through the barrier. The leaked gas will then have to travel all the way to the wellhead in order to be detected. If there is no circulation of mud/fluid in the plugged well, any tracer gas that leaks through the barrier will have to diffuse through the full length of the well from the barrier and to the wellhead through the mud column by means of gravity (percolation). A person skilled in the art will also be aware that, if there is no circulation, the mud column will have to be saturated by tracer gas before the tracer gas may reach the wellhead as free gas, and that the amount of tracer gas that can be absorbed by the mud increases with increasing depth, which is a consequence of Henry's law. In sum, this implies that the sensitivity of the leak detection system will be low and with a significant time delay due lack of circulation and high absorption of tracer gas in the well. The leak detection system would require an enormous amount of tracer gas in order to ensure that the gas may reach the wellhead. In fact, a severe leak, and thus a severely compromised barrier, may never be detected by this leak detection system. On subsea wells, it may further be a challenge to find a suitable place to connect the sensor/detector to the wellhead.

Despite alternative solutions for testing the integrity of a well, the industry is searching for a simpler, time-effective and thereby a lower cost solution for testing the integrity of a well.

SUMMARY

The disclosure has for its object to remedy or to reduce at least one of the drawbacks of the prior art, or at least provide a useful alternative to prior art.

The object is achieved through features, which are specified in the description below and in the claims that follow.

In a first aspect the disclosure relates to a system for testing/verifying the integrity of a well barrier, the system comprising a well including a wellbore and an upper wellbore termination means, such as a wellhead, a mud circulation system and/or a mud conditioning system, a barrier provided in the wellbore, the barrier having an upstream side below the barrier and a downstream side above the barrier; a tracer, a storage means for storing said tracer. The storage means is provided in a lower part of the barrier and/or below the barrier in the well, and comprises a release mechanism for releasing the tracer from the storage mean, wherein the system further comprises a detector for detecting the tracer that has leaked through the barrier and into said mud on the downstream side thereof, the detector being arranged above the wellbore.

The upper wellbore termination means defines a termination of the wellbore at the surface/seabed. It may be a wellhead or, for a permanently abandoned well where the wellhead has been removed, a surface barrier/plug.

The tracer may be releasable by means of a timer, an electronically controlled release, a pressure sensor, a temperature sensor, a valve deteriorating over time or any other release mechanism. It should also be mentioned that the tracer may be released topside before deploying the storage means into the well. The tracer may be released at a constant rate, or the intensity may be varied over time. In certain embodiments, the tracer may be released at large doses over one or more short time intervals, i.e. during one or more so-called delta pulses.

In one embodiment, the system may comprise a pair of detectors set in redundancy in order to eliminate or detect any sensor failure.

The system may comprise one or more detectors arranged in a mud circulation system and/or in a mud conditioning system. Said mud circulation system and said mud conditioning system may have a customized design for a specific rig or an installation, and said mud system is typically arranged above a blowout preventer (BOP).

Arranging the detectors outside above the wellbore in the mud circulation system and/or in the mud conditioning system, enables hardwiring of the detectors without entering the well by means of wireline, coiled tubing, drill pipe etc. This may be advantageous, as it may not interfere with an ongoing well operation and thereby reduce rig time and costs, and also reduces the risk of signal transfer failure. Additionally, there are a number of tracer detectors available in the market that have been proved to function in atmospheric conditions, whereas detectors for deployment in the well and/or in the mud column may require specialized technology, adding cost, risk and development time. The system described in accordance with the first aspect of the disclosure is also beneficial with regards to maintenance, reliability, redundancy and flexibility of the detectors.

The one or more detectors may be arranged in conjunction with a bell nipple, where the mud flows between the well and the mud circulation system and/or to the mud conditioning system. Said arrangement in conjunction with the bell nipple may cover both mud flowing to or from the trip tank, and also to the mud conditioning system. As the bell nipple is close to the well, it is also expected that the bell nipple may be the location outside the well where the concentration of tracer is highest.

The detector may, in addition or as an alternative, be arranged in conjunction with a trip tank in a mud circulation system. This arrangement of the detector may detect tracer in the mud even if the mud is temporarily not circulating in the well. This could be the case while making up or breaking out pipe connection, or when performing operations that do not require circulation of the mud.

The detector may, in addition or as an alternative, be arranged in conjunction with a mud shaker, or any other device for separating mud from cuttings, in a mud conditioning system. The mud shaker is a first phase solid control equipment and may initiate release of tracer gas in the mud. The detector may typically be placed close to the mud flow outlet in the shaker box, or somewhere along the mud outlet for the mud conditioning system.

In one embodiment, two or more sensors may be arranged in conjunction with two or more of the mentioned positions in the mud circulation system and/or mud conditioning system. Having more than one detector may secure redundancy and increase sensitivity and robustness of the sensors. One or more sensors may also be arranged elsewhere outside the well and in certain embodiments the one or more sensors in the mud circulation and/or conditioning system may also be combined with one or more sensors provided in the well, above the barrier.

In a mud circulation line, where a trip tank is included, the mud may flow from the well into the trip tank, the mud may be pumped from the trip tank to the well or the mud may not circulate. In the case where the tracer is a gas, the tracer may be transported through the mud column by means of circulation of the mud, or by buoyancy force acting on the tracer gas volume, or by a combination of the two forces.

In a mud conditioning system, the mud may circulate from the well, and tracer will follow the circulating mud from the well to the mud conditioning system arranged outside the well.

In one embodiment, the barrier may comprise a thermite plug created by means of a chemical, exothermic reaction melting down materials surrounding the wellbore and/or by melting down one or more well elements in order to create a barrier. One method for plugging a well by means of a thermite plug is disclosed in WO 2013135583 A2, to which reference is made for a more in-depth description of this technology. The thermite plug may be supported by a bridge plug or another mechanical plug in the wellbore. In an alternative embodiment, the plug may comprise bismuth or bismuth-based alloys.

In another embodiment, the barrier may comprise a cement plug formed from consolidated, fluidized cement slurry as will be understood by a person skilled in the art.

The cement plug may be formed by means of a so-called perforate wash and cement (PWC) technique, which includes pre-perforation and cleaning of the wellbore and annuli in the area where the cement plug is to be set. This technique is e.g. commercially available from the company Hydrawell Intervention AS and disclosed in WO 2012/096580 to which reference is made for a more in-depth description of this technology. As a somewhat unusual alternative to cement slurry, a fluidized plugging material may comprise a fluidized particulate mass for formation of a plug of particulate mass. A different use of a fluidized particulate mass in a well is described in WO 01/25594 A1 and in WO 02/081861 A1, among other places to which reference is made for a more in-depth description of this technology. The cement plug may be supported by a mechanical plug such as a bridge plug in the wellbore. The bridge plug may be provided with a storage means and a release mechanism for tracer as will be described in more detail below in relation to the third aspect of the disclosure.

In one embodiment, the tracer may be helium, another noble gas or an inert gas in general. Use of helium as a tracer may be advantageous as helium is non-toxic, inert and for most reservoirs with very low background activity downhole, implying that there will be low, if any, background "noise" from ambient helium in the well. It is possible to detect helium with high sensitivity down to the ppm level. A helium detector typically includes a helium "sniffer"

connected to a mass spectrometer, where the latter is doing the actual analysis while the former is collecting the gas. For regions where helium is prevalent in the reservoirs (e.g. North America) an alternative inert gas may be preferable. A person skilled in the art will be familiar with mass spectrometer technology, which will not be discussed in detail herein.

In one embodiment the tracer may be a halogen or a halogen compound. The halogen or halogen compound may be a cooler such as chlorofluorocarbons (CFC), hydrochlorofluorocarbons (HCFC) and hydrofluorocarbons LHFC). Halogens or halogen compound may be detected by means of robust, well-proven, highly sensitive and low-cost detectors that are typically known from the cooling industry. The detectors may typically be ionic emission types, though detectors based on absorption of infrared light are also known to be used for this purpose.

In one embodiment the tracer may be hydrogen. The hydrogen may be mixed with nitrogen for increased stability, such as in an already commercially available and relatively low-cost mixture with 5% hydrogen and 95% nitrogen. Hydrogen is very light with high thermal velocity and low viscosity, and it has the potential of leaking through very small channels in the barrier. Hydrogen may also be detected down to the ppm level. Ambient hydrogen level in the well is expected to be very low, and there will thus be low, if any, background noise from ambient hydrogen. A variety of different hydrogen sensors is known, each with its different advantages and disadvantages. A summary can be found in the book "Hydrogen fuel" published by CRC press in 2008 and edited by Ram. B Gupta. Chapter 15 in this book relates to "Hydrogen sensing and detection" and is written by Prabhu Soundarrajan and Frank Schweighardt. Reference is made to this chapter for an in-depth description of various hydrogen detectors. Examples of known hydrogen detectors are solid-state detectors, including metal-oxide semiconductor (MOS) and palladium-based detectors, catalytic bead (CB) detectors, electrochemical detectors, surface acoustic wave (SAW) detectors and various micromechanical (MEMS) detectors. Solid state hydrogen detectors may be preferred in some embodiments due their low prize, compactness, low maintenance requirements and flexible geometry.

In one embodiment the tracer may be an isotope, a radioactive material or any detectable chemical or radioactive gas, such as gas molecules containing tritium.

In one embodiment, the system according to the first aspect of the disclosure may comprise a control and data acquisition unit for collecting and processing data from said tracer detector(s).

A pressure sensor with wireless transmission may also be provided below the barrier in the well, which may enable monitoring the pressure difference across the barrier in the well. Monitoring of the pressure difference across the barrier may be useful for identifying the different mechanisms that may drive tracer through the barrier. A pressure sensor may also be coupled to the release valve of the tracer gas, to enable a pressure-regulated valve. This may ensure a constant overpressure below the barrier to be verified.

The tracer canister may be deployed to the desired depth and position in the well by different conveying means that will be known to a skilled person. The tracer canister may be clamped on, or otherwise connected to a bridge plug or may be integrated in the bridge plug, and thereby be transported through the well along with the plug. Various embodiments of bridge plugs with integrated canisters are described below in relation to the third aspect of the disclosure. The tracer canister may be transported on a dedicated run on pipe, coiled tubing or wireline. The tracer canister may be dropped as a "dart" into the pipe or cased well and be transported down the well by gravity. The tracer canister may also be pumped with the mud to its intended depth. The tracer canister may be arranged below the barrier or integrated in a lower part of the barrier.

In a second aspect, the disclosure relates to a method for testing the integrity of a barrier in a well by means of a system according to the first aspect of the disclosure, wherein the method comprises the steps of:
    releasing the tracer from below the barrier;
    creating a pressure difference across the barrier; and
    monitoring the concentration of tracer in the mud by using detectors arranged in the mud circulation system and/or in the mud conditioning system.

It should be mentioned, as already described above, that release of the tracer from the storage means may be initiated already before the storage means is deployed in the well.

The pressure difference across the barrier may be realized by reducing the pressure above the barrier and/or increasing pressure below the barrier. The pressure difference will attempt to force the tracer from the upstream side of the barrier and to the downstream side of the barrier, which may make the integrity test more robust as it does not have to rely solely on buoyancy drift and/or diffusion of the tracer. In order to reduce the pressure in the well above the barrier, the pressure in the whole mud column may be reduced by replacing the mud with fluid of lower specific gravity. For increasing the pressure below the barrier, the tracer storage means may be a pressurized canister supplying tracer at a pressure higher than the pressure below the barrier to a closed space below the barrier that is to be tested as will become clearer in the following with reference to the figures.

In one embodiment, the method may include tagging of the barrier before releasing the tracer. This may typically be the case when the barrier includes a cement plug, where standards require tagging as a means for verifying the integrity of the barrier. It should be mentioned, however, that the applicant envisions that the plug, system and method dew scribed herein may subsequently serve as an alternative, rather than an addition, to mechanically tagging of the barrier, which may then ultimately remove the need for rig-based technologies for the verification of barrier integrity.

The system and method according to the first and second aspects of the disclosure are specifically well suited when mud is circulated or at least still adapted to be circulated in the well.

In a third aspect, the disclosure relates to a plug, such as a bridge plug, said plug being connectable to or integrated with a storage means for storing and releasing tracer in a well. The plug may be provided with a pressure-tight seal. Different embodiments of such a plug is shown and described in more detail below with reference to the drawings. It should be noted that such a plug may be used together with a system and method according to the first and second aspects of the disclosure, respectively, or equally well with a system and method according to the four and fifth aspects of the disclosure, respectively, In a fourth aspect the disclosure relates to a system for testing the integrity of a well barrier, the system comprising:
    a well including a wellbore and a upper wellbore termination means, such as a wellhead;

a barrier provided in the wellbore, the barrier having an upstream side below the barrier and a downstream side above the barrier;

a tracer;

a storage means for storing said tracer, the storage means being provided below the barrier in the well; and a release mechanism for releasing the tracer from the storage means, wherein the system further comprises a detector for detecting the tracer that has leaked through the barrier, the detector being provided in the wellbore between said barrier and said upper wellbore termination means.

The upper wellbore termination means defines a termination of the wellbore at the surface/seabed. It may be a wellhead or, for a permanently abandoned wells where the wellhead has been removed, a surface barrier/plug.

The system according to the fourth aspect of the disclosure solves at least some of the drawbacks of the prior art, in particular for non-circulating wells, by providing the tracer sensor/detector in the wellbore rather than outside the well at the wellhead. The system is suitable for monitoring wells that are plugged temporarily or permanently.

The tracer may be releasable by means of a timer, an electronically controlled release, a pressure sensor, a temperature sensor, a valve deteriorating over time or any other release mechanism. It should also be mentioned that the tracer may be released topside before deploying the storage means into the well. The tracer may be released at a constant rate, or the intensity may be varied over time. In certain embodiments, the tracer may be released at large doses over one or more short time intervals, i.e. during one or more so-called delta pulses.

In one embodiment of a system according to the disclosure said detector may be provided in the wellbore closer to the barrier than to the upper wellbore termination means, preferably 0-100 meters above the barrier and even more preferably 0-10 meter above the barrier. By placing the detector relatively close to the barrier, the time it takes for any leaked gas to reach the detector, compared to a detector located at a larger distance from the barrier, will be reduced. The amount of gas required for any leaked tracer to reach the detector is also reduced since a shorter column of mud will have to be saturated for the tracer to reach the detector. The detector may be deployed from and connected to a conveying means, such as a wireline, slickline, coiled tubing, drill pipe etc. in the wellbore. In one embodiment the system may be adapted to transmit detector data from the wellbore and up to the surface/seabed through the conveying means, whereas in another embodiment the detector is in addition or as an alternative connected to a storage means for storing detector data locally downhole. Detector data stored downhole may be retrieved upon retrieving the detector from the well.

In an alternative embodiment, the detector may be placed on the barrier. The detector may be lowered down into the well to be placed on the barrier, or, where the barrier is a mechanical barrier, the detector may even be an integrated part of the barrier, such as in a plug according to the third aspect of the disclosure. In this embodiment, which does not require a permanent connection to one of the conveying means mentioned above, the detector is preferably connected to, or even integrated with, a storage means for storing detector data that may be retrieved subsequently. The detector may be powered from an integrated battery.

In one embodiment, the barrier may comprise a thermite plug created by means of a chemical, exothermic reaction melting down materials surrounding the wellbore and/or by melting down one or more well elements in order to create a barrier. One method for plugging a well by means of a thermite plug is disclosed in WO 2013135583 A2, to which reference is made for a more in-depth description of this technology. The thermite plug may be supported by a bridge plug or another mechanical plug in the wellbore. In an alternative embodiment, the plug may comprise bismuth or bismuth-based alloys.

In another embodiment, the barrier may comprise a cement plug formed from consolidated, fluidized cement slurry as will be understood by a person skilled in the art. In one embodiment, the cement plug may be formed by means of a so-called perforate wash and cement (PWC) technique, which includes pre-perforation and cleaning of the casing in the area where the cement plug is to be set. This technique is e.g. commercially available from the company Hydrawell Intervention AS and disclosed in WO 2012/096580 to which reference is made for a more in-depth description of this technology. As a somewhat unusual alternative to cement slurry, a fluidized plugging material may comprise a fluidized particulate mass for formation of a plug of particulate mass. A somewhat different use of a fluidized particulate mass in a well is described in WO 01/25594 A1 and in WO 02/081861 A1, among other places to which reference is made for a more in-depth description of this technology. The cement plug may be supported by a mechanical plug such as a bridge plug in the wellbore.

In one embodiment the tracer may be helium, another noble gas or an inert gas in general. Use of helium as a tracer may be advantageous as helium is non-toxic, inert and with very low background activity downhole, implying that there will be low, if any, background "noise" from ambient helium in the well. It is possible to detect helium with high sensitivity down to the ppm level. A helium detector typically includes a helium "sniffer" connected to a mass spectrometer, where the latter is doing the actual analysis while the former is collecting the gas. A person skilled in the art will be familiar with mass spectrometer technology, which will not be discussed in detail herein.

In one embodiment the tracer may be a halogen or a halogen compound. The halogen or halogen compound may be a cooler such as chlorofluorocarbons (CFC), hydrochlorofluorocarbons (HCFC) and Hydrofluorocarbons (HFC). Halogens or halogen compound may be detected by means of robust, well-proven, highly sensitive and low-cost detectors that are typically known from the cooling industry. The detectors may typically be ionic emission types, though detectors based on absorption of infrared light are also known to be used for this purpose.

In one embodiment the tracer may be hydrogen. The hydrogen may be mixed with nitrogen for increased stability, such as in an already commercially available and relatively low-cost mixture with 5% hydrogen and 95% nitrogen. Hydrogen is very light with high thermal velocity and low viscosity, and it has the potential of leaking through very small channels in the barrier. Hydrogen may also be detected down to the ppm level. Ambient hydrogen level in the well is expected to be very low, and there will thus be low, if any, background noise from ambient hydrogen. A variety of different hydrogen sensors is known, each with its different advantages and disadvantages. A summary can be found in the book "Hydrogen fuel" published by CRC press in 2008 and edited by Ram. B Gupta. Chapter 15 in this book relates to "Hydrogen sensing and detection" and is written by Prabhu Soundarrajan and Frank Schweighardt. Reference is made to this chapter for an in-depth description of various hydrogen detectors. Examples of known hydrogen detectors are solid-state detectors, including metal-oxide semiconductor (MOS) and palladium-based detectors, catalytic bead (CB) detectors, electrochemical detectors, surface acoustic wave (SAW) detectors and various micromechanical (MEMS) detectors. Solid state hydrogen detectors may be preferred in some embodiment due their low prize, compactness, low maintenance and flexible geometry.

In alternative embodiments, the tracer may be an isotope, a radioactive material or any detectable chemical.

In one embodiment, the system may comprise a guiding means for "guiding" the tracer towards the detector. The guiding means may e.g. be shaped as a funnel or another concentrating shape wherein an actively detecting part of the detector, such as a detecting surface, is placed at the narrow/concentrating end of the guiding means downstream of the broader opening. The guiding means may increase the sensitivity of the system according to the disclosure.

In one embodiment, the systems according to the fourth aspect of the disclosure may comprise a control unit and a data transmission means for connecting said detector to said control unit. The control unit may be located topside, while the data transmission means may be a conveying means prepared for signal transmission. The conveying means may be a wireline, electric coil tubing drill pipe etc. Alternatively, the data transmission means may be a mud pulse generator, thus requiring circulation in the well in order to transmit the signals.

In one embodiment, the system according to the fourth aspect of the disclosure may comprise a second barrier that may be set permanently or temporarily in the well above the barrier that is to be tested in order to create a local under-pressure in an isolated volume that is established between this second barrier and the barrier under testing and a radially surrounding casing or formation. Alternatively, the second barrier may be placed below the barrier that is to be tested in order to create a local overpressure. In both alternative embodiments, the idea is to create a pressure difference across the barrier that is to be tested. This second barrier may simply be a resettable packer formed with a through-bore, including check valve and a pump for pumping out mud (or another wellbore fluid) from or into, respectively, the isolated volume in order to create the pressure difference. The second barrier may also be another type of mechanical barrier with a pressure tight seal, such as a bridge plug. The mentioned pressure gradient across the barrier may be beneficial for making the integrity test more robust and reliable as it does not have to rely solely on gravitational drift and/or diffusion of the tracer, and thus to more accurately simulate a pressure build-up from below. The reduced pressure may also be realised by lowering the pressure in the full mud column above the barrier to be tested. However, isolating the pressure reduction to the volume immediately above, or increasing the pressure immediately below, the barrier to be tested may exclude other sources of leakage from the test as well as reduce the required amount/volume of tracer needed to perform the integrity test. A pressure sensor may be provided in connection with the isolated volume, e.g. integrated with the second barrier, in order to verify that the pressure is indeed reduced/increased in the isolated volume. A further advantage of this embodiment is that it is possible to lower or increase the pressure (locally) in the well without the need for a fluid-carrying string, implying that wireline may be used to deploy the second barrier in the well. The detector may be suspended from the second barrier so as to be placed in the isolated volume.

A pressure sensor may also be provided below the barrier in the well, which may enable monitoring the pressure difference across the barrier in the well. Monitoring of the pressure difference across the barrier may be useful for identifying the difference mechanisms that may drive tracer through the barrier.

In a fifth aspect, the disclosure relates to a method for testing the integrity of a barrier in a well by means of a system according to the fourth aspect of the disclosure, wherein the method comprises the steps of:
lowering the detector into the well;
releasing the tracer from below the barrier; and
creating a pressure difference across the barrier in the well;

It should be mentioned, as already described above, that release of the tracer from the storage means may be initiated already before the storage means is deployed in the well.

The pressure difference across the barrier will attempt to force the tracer from the upstream side of the barrier and to the downstream side of the barrier, which may make the integrity test more robust as it does not have to rely solely on gravitational drift and/or diffusion of the tracer. In order to reduce the pressure in the well above the barrier, the pressure in the whole mud column may be reduced by pumping out mud from the well, or by replacing the mud with mud of lower specific gravity. Alternatively, as discussed above, the pressure may be lowered or increased locally above or below the barrier, respectively, by isolating a volume in the well above or below the barrier, typically be setting a second barrier in the wellbore and by reducing or increasing the pressure between the barrier and the second barrier by pumping out mud from or into the isolated volume. The local pressure gradient across barrier to be tested may be beneficial for excluding other sources of leakage in the system, and may thus contribute to verifying the integrity of the barrier with a larger degree of certainty. The local pressure gradient may be realised by setting a resettable packer in the wellbore, the resettable packer being formed with a through-bore with a check valve and a pump. The resettable packer may be deflated and retrieved from the well after the integrity test has been performed.

In one embodiment, the method may include tagging of the barrier before releasing the tracer. This may typically be the case when the barrier includes a cement plug, where standards require tagging as a means for verifying the integrity the barrier. It should be mentioned, however, that the applicant envisions that the system and method described herein may subsequently serve as an alternative, rather than an addition, to mechanically tagging of the barrier, which may then remove the need for rig-based technologies for the verification of barrier integrity.

In one embodiment, the method may comprise the step of lowering the detector into the well after the barrier has consolidated in the well. This may be particularly useful when the barrier is a thermite plug, which during settling may generate extreme heat that can compromise a nearby detector. Also, the chemical, exothermic reaction may also generate hydrogen or another tracer, which may initially create noise for the detector. Hence it may be beneficial to lower the detector into the well, on a conveying means such as wireline, after the thermite plug has been created, the temperature has cooled down, and the chemical reaction no longer influences the detection of tracer in any significant way. It should also be noted that the detector in this embodiment may be used to verify that the chemical, exothermic process has ended by detection of a decay in hydrogen concentration, or a decay in another gas resulting from the chemical, exothermic process.

BRIEF DESCRIPTION OF THE DRAWINGS

In the following are described examples of preferred embodiments illustrated in the accompanying drawings, wherein.

DETAILED DESCRIPTION OF THE DRAWINGS

Figure 1:
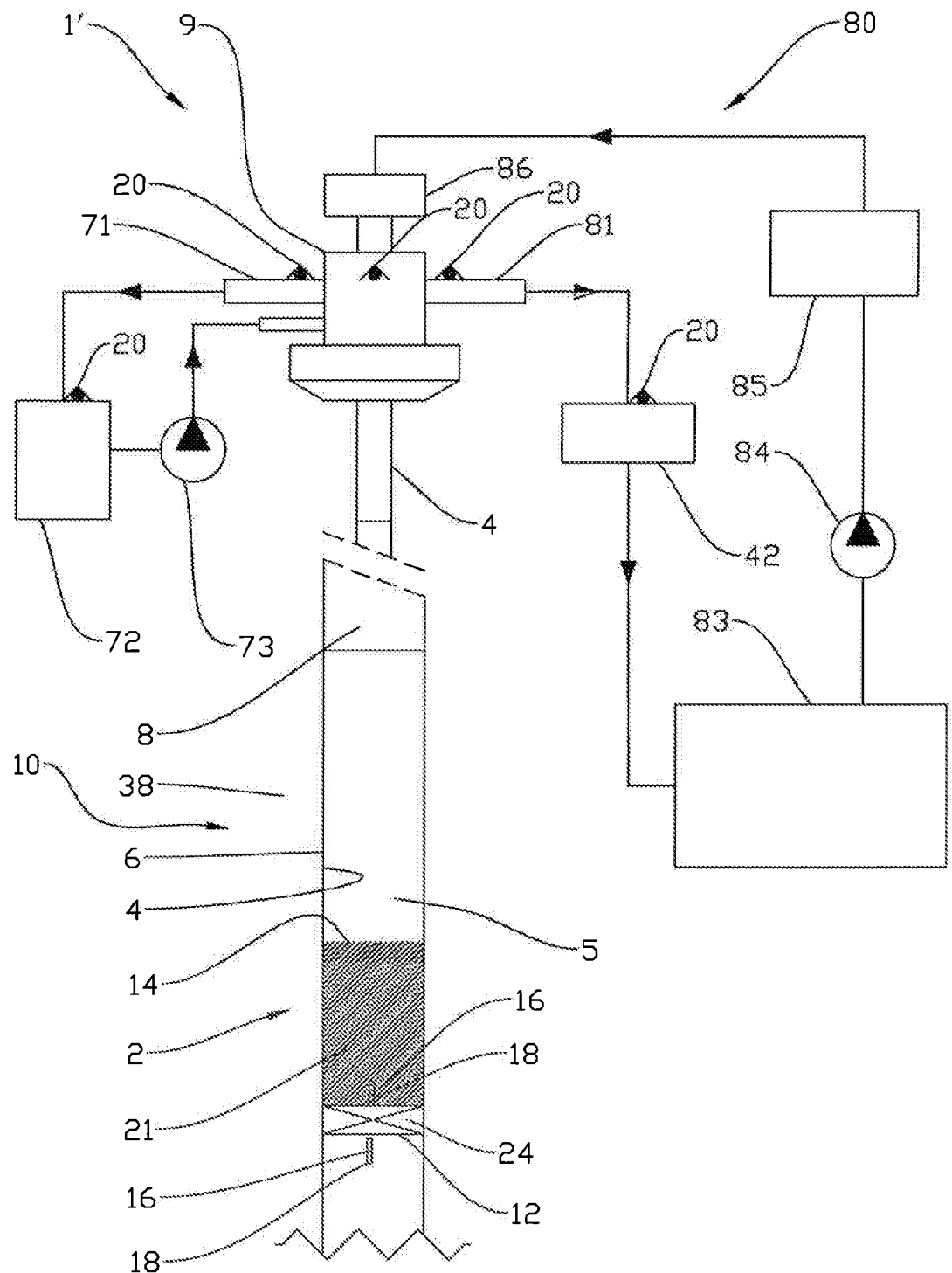
FIG. 1 shows a first embodiment of a system according to the first aspect of the disclosure.

In the following the reference numerals 1' and 1 will indicate a system according to the first and fourth aspects of the disclosure, respectively, whereas the reference numeral 10 indicates a well being a part of such a system. Reference numeral 70 indicates a mud circulation system, whereas reference numeral 80 indicates a mud conditioning system. The system 1' may comprise a mud circulation system 70 and/or a mud conditioning system 80.

The drawings are shown highly simplified and schematic and the various features therein are not necessarily drawn to scale. Identical reference numerals refer to identical or similar features in the drawings.

FIG. 1 shows a first embodiment of a system 1' according to the first aspect of the present disclosure. A barrier 2, here in the form of a cement plug 21, has been set in a well 10. The cement plug 21 has been formed based on a not-shown fluidized cement slurry as will be known to a person skilled in the art. A mechanical plug 24, such as a bridge plug, used as a fundament for the cement plug 21, typically needs to withstand the required pressure difference during settling of the cement plug 21. However, over time, pressure seals (not shown) of the mechanical plug tend to disintegrate and make the mechanical plug 24 leaky. A bridge plug is not designed to be pressure tight for "eternity", as is required for permanent plugging of a well. Therefore, in order to be able to verify the integrity of the cement plug 21, irrespective of the condition of the mechanical plug 24, it may be beneficial to release tracer 16 from above the mechanical plug 24. The canister 18 above the mechanical plug 24 may be provided in addition to or as an alternative to a canister below the mechanical plug. Placing the tracer canister 18 above the mechanical plug 24 will enable establishing a local overpressure in the closed volume (not shown in FIG. 1) available between the mechanical plug 24 and the bottom of the cement plug 21, that will create the desired differential pressure across the barrier 2, here shown as a cement plug 21. The closed volume is shown in FIGS. 17 and 19-21 and discussed below. A pressure difference/gradient may be established across the barrier 2 as described herein for assisting in driving tracer through the barrier 2.

The wellbore 4 is radially delimited from a surrounding formation 38 by means of a casing 6, while the wellbore 4 is terminated at its upper end by means of a wellhead 8. The wellhead 8 may be placed on a not shown seabed or on a dry surface. In an alternative, not shown embodiment, the wellbore 4 may be open, i.e. un-cased as a part of the casing may be milled away to enable the formation of a cement plug across the full cross-section of the wellbore 4. The barrier 2 has an upstream side 12 below the barrier 2 and a downstream 14 side above the barrier 2, defining the normal direction of fluid flow in a non-plugged well 10.

After the cement plug 21 has consolidated, a release mechanism, which in one embodiment may be timer-based, releases the tracer 16 from the canister 18. If the barrier 2 works as intended, the tracer 16 will remain below the barrier 2. However, if the barrier 2 has been compromised, the tracer 16 will leak through the barrier 2, towards the downstream side 14 and into the mud 5.

In a mud conditioning system 80, the tracer 16 will follow the circulating mud 5 from the well 10 to the mud conditioning system 80 where tracer 16 passing the barrier 2 will be detected by a at least one tracer detector 20. The shown embodiment indicates some possible arrangements of the detector 20: In conjunction with a bell nipple 9 and/or in conjunction with a mud outlet 81 and/or in conjunction with a mud shaker 82. The mud conditioning system 80 further comprises a pump 84 and a standpipe manifold 85.

In a mud circulation system 70, the mud 5 may be non-circulating, or the mud may flow from the well 10 and to the trip tank 72 or the mud may be pumped from said trip tank 72 into the well. The tracer 16 will penetrate said mud 5 to the mud circulation system 70 where tracer 16 passing the barrier 2 will be detected by at least one detector 20. The shown embodiment indicates some possible arrangements of the detector 20: In conjunction with the bell nipple 9, a mud return outlet 71 and/or a trip tank 72.

To improve the robustness of the test, a pressure difference may be created across the barrier 2 in order to help the tracer 16 to penetrate the barrier 2. Said pressure difference may be established by reducing the pressure above the barrier 2 by means known to skilled persons of the art. Alternatively, the pressure may be increased below the barrier. By releasing the high-pressure tracer canister 18, the pressure below the barrier 2 may be increased to create a sufficient differential pressure across the barrier 2 for driving the tracer 16 across the barrier 2 in case of a leak.

The detector 20 may be placed inside a guiding means for guiding and concentrating tracer 16 towards the detector 20 itself. The detector data may be transmitted to a not-shown control unit.

Figure 2:
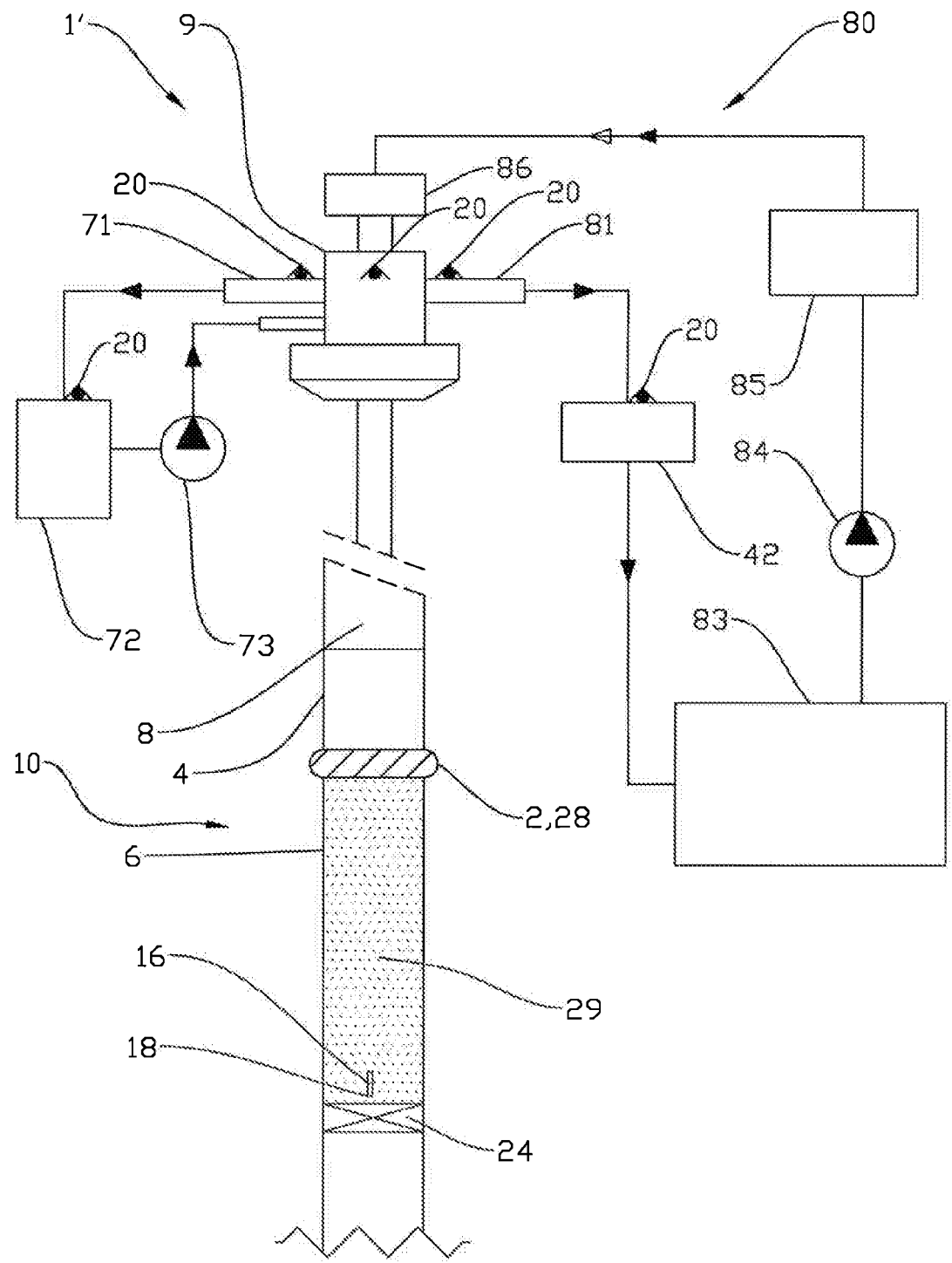
FIG. 2 shows a second embodiment of a system according to the first aspect of the disclosure.

FIG. 2 shows a second embodiment of a system 1' according to the first aspect of the present disclosure. The embodiment is similar to the one shown in FIG. 1 with the difference that the barrier 2 is a thermite plug 28. The functionality of thermite plugs was e.g. described in above-referenced WO 2013135583 A2 and will not be discussed in further detail herein.

A mechanical 24 plug may be used to support the thermite plug 28 in the wellbore 4. A layer of sand 29 may be arranged between the bridge plug and the thermite plug in order to thermally isolate the bridge plug 24 and the tracer canister 18 from the heat caused by the exothermic process.

Figure 3:
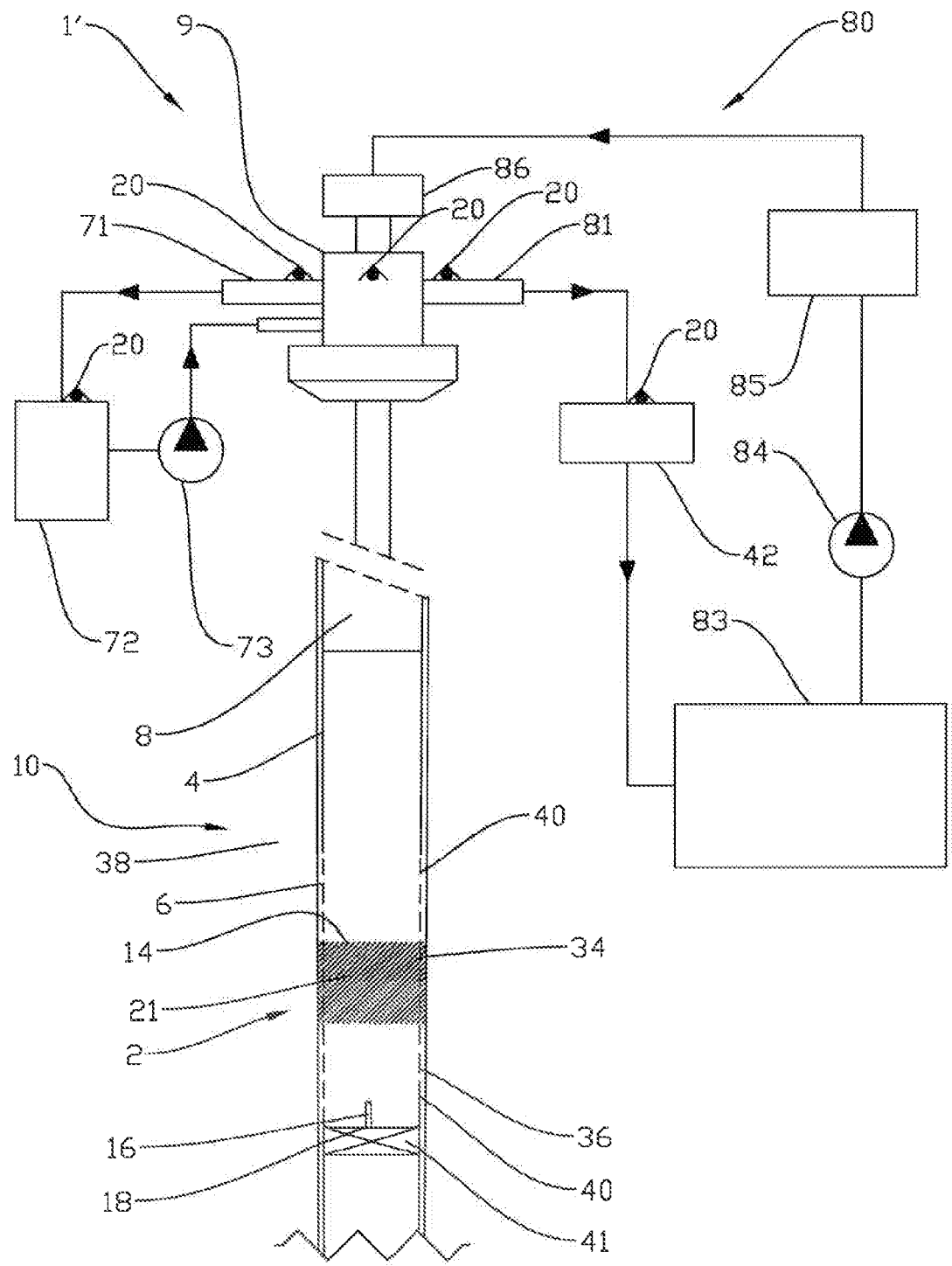
FIG. 3 shows a third embodiment of a system according to the first aspect of the disclosure.

FIG. 3 shows a third embodiment of a system 1' according to the present disclosure. The barrier 2 is constituted by a "Perforate Wash and Cement" plug (PWC) established by perforation of the casing(s) 6 and pre-washing of the perforations 34 and the annulus 36 between the casing 6 and the formation 38 before supplying cement slurry to the wellbore 4 including into the annulus 36 outside the perforations 34 at the desired depth. The cement plug 21 uses a mechanical fundament 41, such as a bridge plug, in the wellbore 4. The PWC technology is e.g. disclosed in the above-referenced WO 2012/096580 and will not be discussed in further detail herein. In this embodiment, additional perforations 40 are formed in the casing 6 above and below the cement plug 21, which also will enable verification of the integrity of the part of the cement plug 21 located in the annulus 36. Alternatively, the cement plug 21 may be set shorter than the perforation interval, leaving perforations above and below the cement plug 21, enabling pressure communication (in case of a leaking barrier) across the casing sections and annuli, above and below the cement plug 21.

In a similar, not shown embodiment where the wellbore is only lined with a single casing and the surrounding formation is shale, the systems according to the disclosure may also be used to test the barrier integrity of a so-called "creeping shale" seal around the casing. It has been shown that shale tends to creep against the wellbore over time so as to form a natural seal around the casing which may form an equally efficient sealing barrier compared to cement. A similar method as shown in FIG. 3 for PWC cement, may be used in a shale reservoir by perforating the casing above and below the zone with creeping shale to test the integrity of the shale barrier outside the casing in addition to testing the integrity of a barrier, typically a cement plug, placed centrally in the wellbore.

Figure 4:
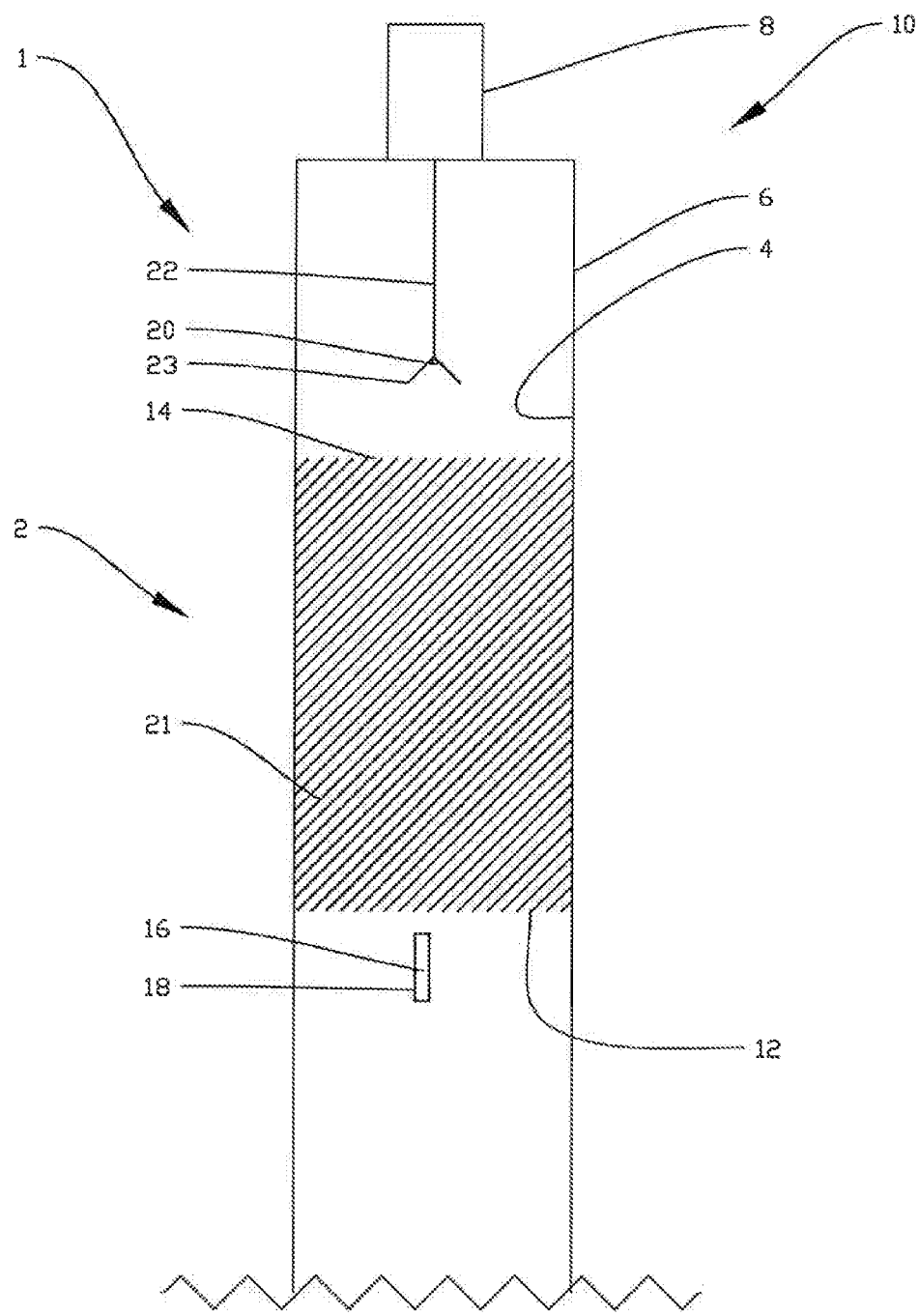
FIG. 4 shows a first embodiment of a system according to the fourth aspect of the disclosure.

FIG. 4 shows a first embodiment of a system 1 according to the fourth aspect of the present disclosure. A barrier 2, here in the form of a cement plug 21 has been set in the well 10. The cement plug 21 has been formed based on a not-shown fluidized cement slurry as will be known to a person skilled in the art. The wellbore 4 is radially delimited from a surrounding formation by means of casing 6, while the wellbore 4 is terminated at its upper end by means of a wellhead 8. The wellhead 8 may be placed on a not shown seabed or on a dry surface. In an alternative, not shown, embodiment, the wellbore 4 may be open, i.e. un-cased. The barrier 2 has an upstream side 12 below the barrier and a downstream 14 side above the barrier 2, defining the normal direction of fluid flow in a non-plugged well 10. To test the integrity of the barrier 2, the system 1 according to the disclosure is provided with a tracer 16 stored in a canister 18. After the cement plug 21 has consolidated, a release mechanism, which may be timer-based, releases the tracer 16 from the canister 18. A pressure difference/gradient may be established across the barrier 2 as described herein for assisting in driving tracer through the barrier 2. If the barrier 2 works as intended, the tracer 16 will remain below the barrier 2. However, if the barrier 2 has been compromised, the tracer 16 will leak through the barrier 2, towards the downstream side 14 thereof, where it will be detected by a tracer detector 20. In the shown embodiment, the detector 20 is suspended from a conveying means in the form of a wireline 22 a few metres above the barrier 2 in the wellbore 4. It should also be noted, though not shown in the drawings discussed herein, that the wireline will normally extend through the wellhead 8, and up to the surface/rig. In the shown embodiment, the detector 20 is placed inside a guiding means 23 for guiding and concentrating tracer 16 towards the detector 20 itself. In the shown embodiment the guiding means 23 is funnel-shaped. Any detected leak of tracer 16 by the detector 20 will be transmitted to topside via the wireline 22. The detector data will further be transmitted through the wellhead and to a not-shown control unit located topside.

Figure 5:
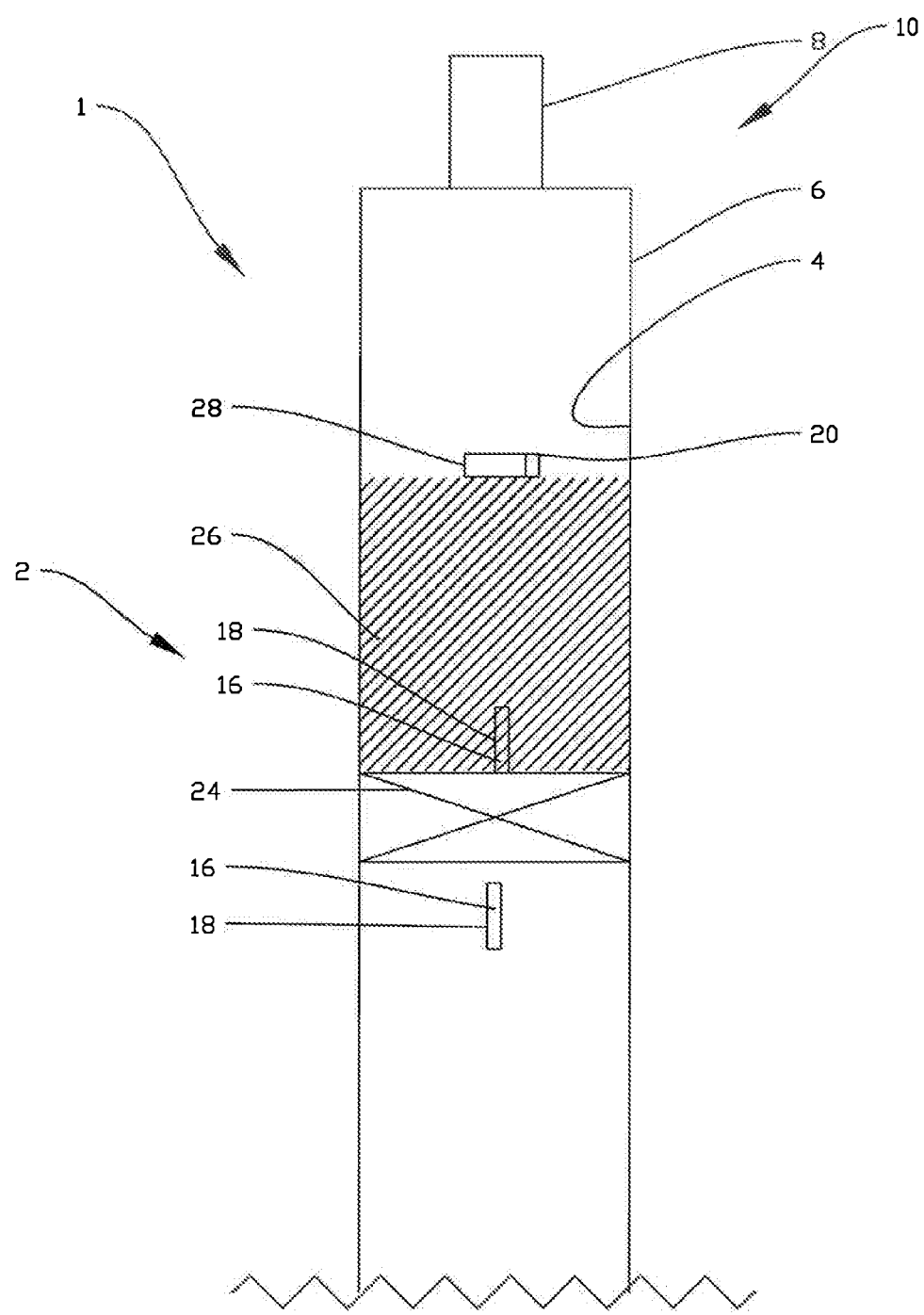
FIG. 5 shows a second embodiment of a system according to the fourth aspect of the disclosure.

FIG. 5 shows a second embodiment of a system 1 according to the fourth aspect of the disclosure, where the detector 20 is placed on the barrier 2. The barrier 2 in this embodiment includes both a mechanical plug 24 as well as a shorter cement plug 26. Any leak of tracer 16 from below the mechanical plug 24 and to above the cement plug 26 may be sensed by the detector 20. In this embodiment, the detector is not continuously transmitting data to topside, but rather stores detector data in a data storage means 28. The data storage means 28 may be retrieved by means of a wireline, and the detector data may be read topside upon retrieval of the data storage means 28. Indicated in FIG. 5 is also an alternative or additional placement of a canister 18 with tracer 16 above the mechanical plug 24, but below/at the bottom of the cement plug 26. A mechanical plug, such as bridge plug, used as a fundament for a cement plug, typically needs to withstand the required pressure difference during settling of the cement plug 26. However, over time, seals (not shown) of the mechanical plug tend to disintegrate and make the mechanical plug leaky. Therefore, to be able to verify the integrity of the cement plug 26, irrespective of the condition of the mechanical plug 24, it may be beneficial to release tracer also from above the mechanical plug 24. This placement of the source may also be combined with a detector attached to a wireline or drill pipe, for real-time communication.

Figure 6:
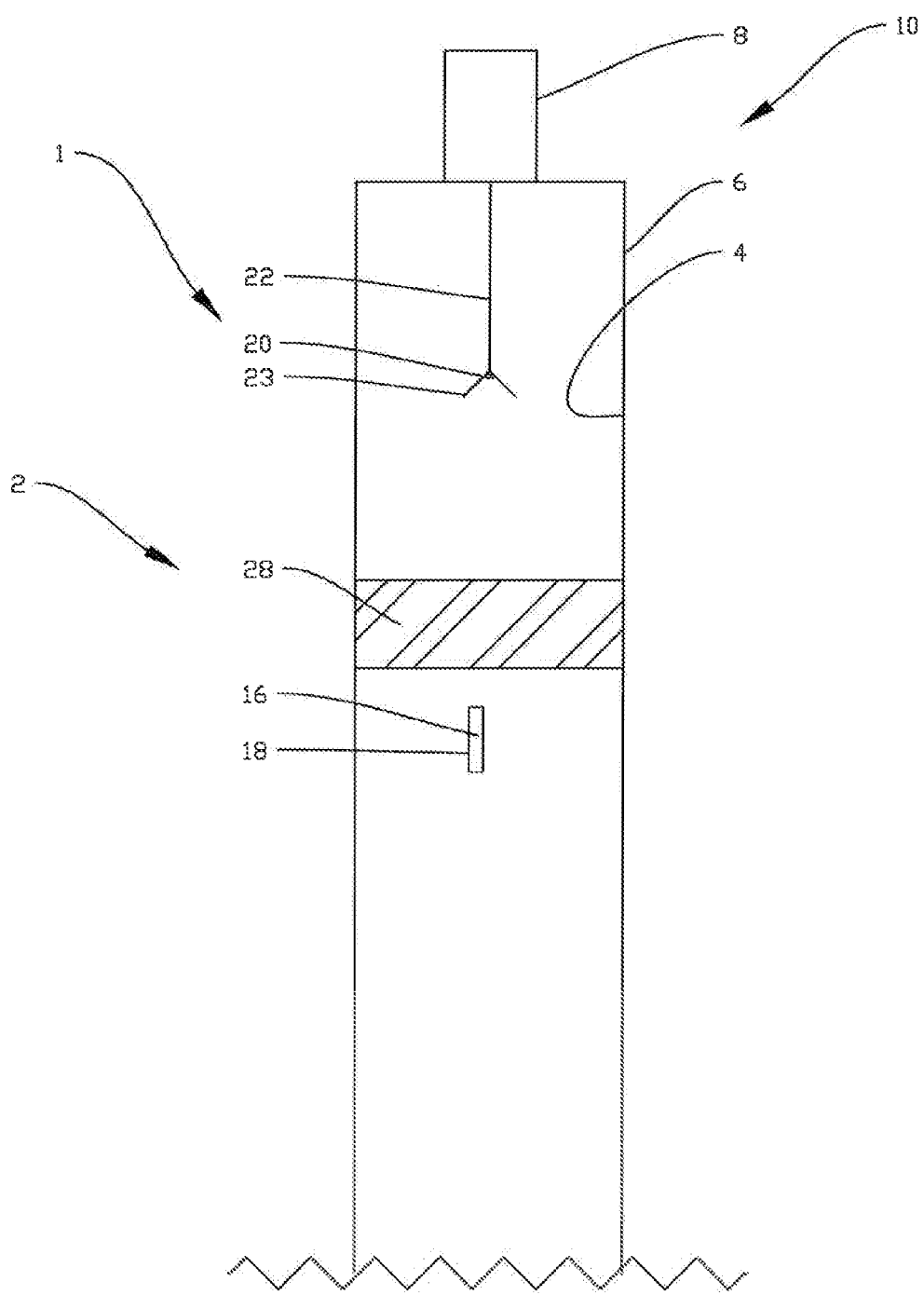
FIG. 6 shows a third embodiment of a system according to the fourth aspect of the disclosure.

FIG. 6 shows a third embodiment of a system 1 according to the fourth aspect of the present disclosure. The embodiment is similar to the one shown in FIG. 4 with the difference that the barrier 2 is a thermite plug 28. The functionality of thermite plugs was described in above-referenced WO 2013135583 A2 and will not be discussed in further detail herein. A not shown bridge plug or another mechanical plug may be used to support the thermite plug 28 in the wellbore 4.

Figure 7:
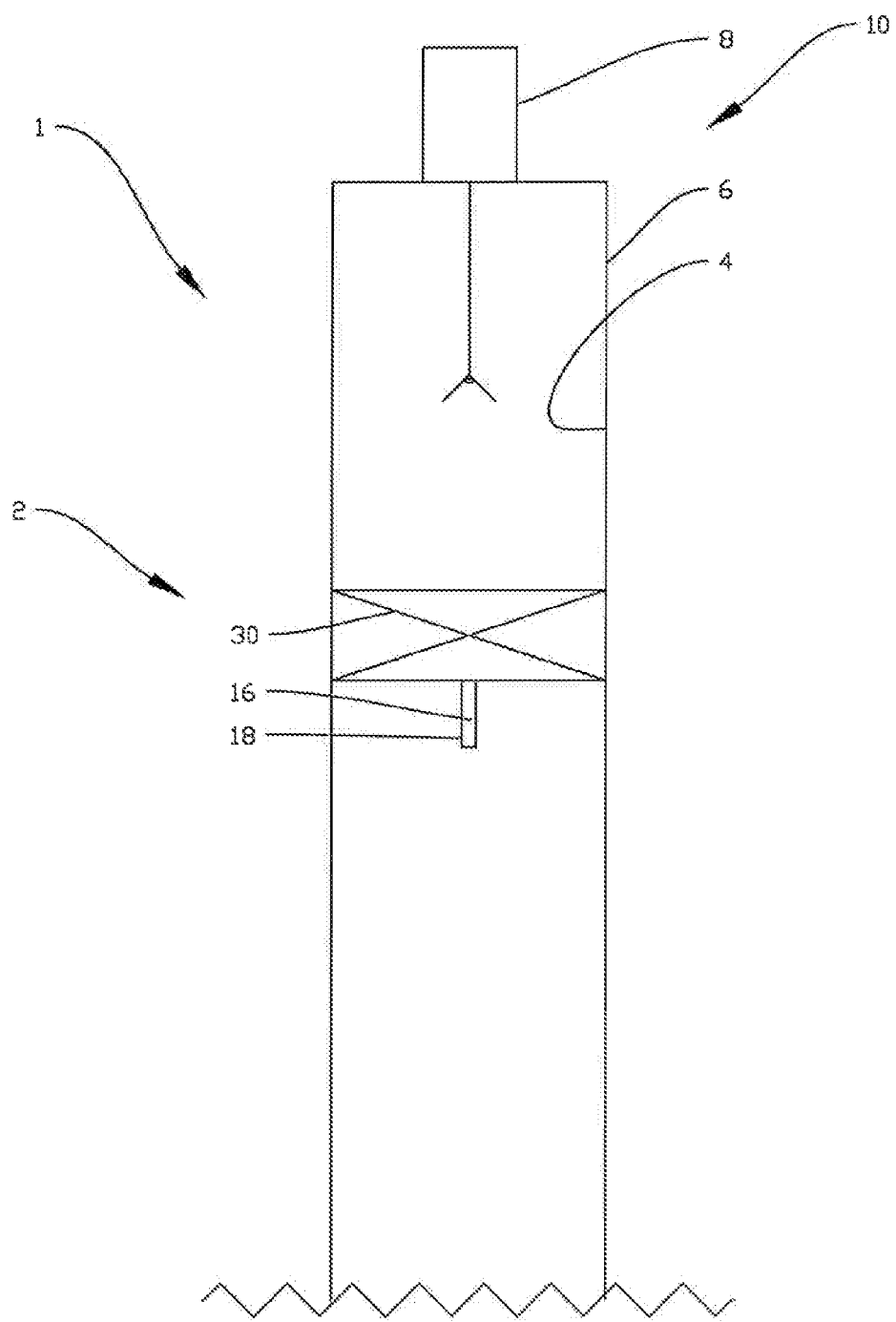
FIG. 7 shows a fourth embodiment of a system according to the fourth aspect of the disclosure.

FIG. 7 shows a fourth embodiment of a system 1 according to the fourth aspect of the disclosure. In the shown embodiment, the barrier 2 is constituted by a bridge plug 30 to which the canister 18 with the tracer 16 is connected, implying that the canister 18 is run into the well 10 together with and potentially integrated with the bridge plug 30. The bridge plug constitutes a temporary barrier in the well 10. Bridge plugs 30 with provided with canisters 18 are discussed in more detail with reference to FIGS. 12-21 below.

Figure 8:
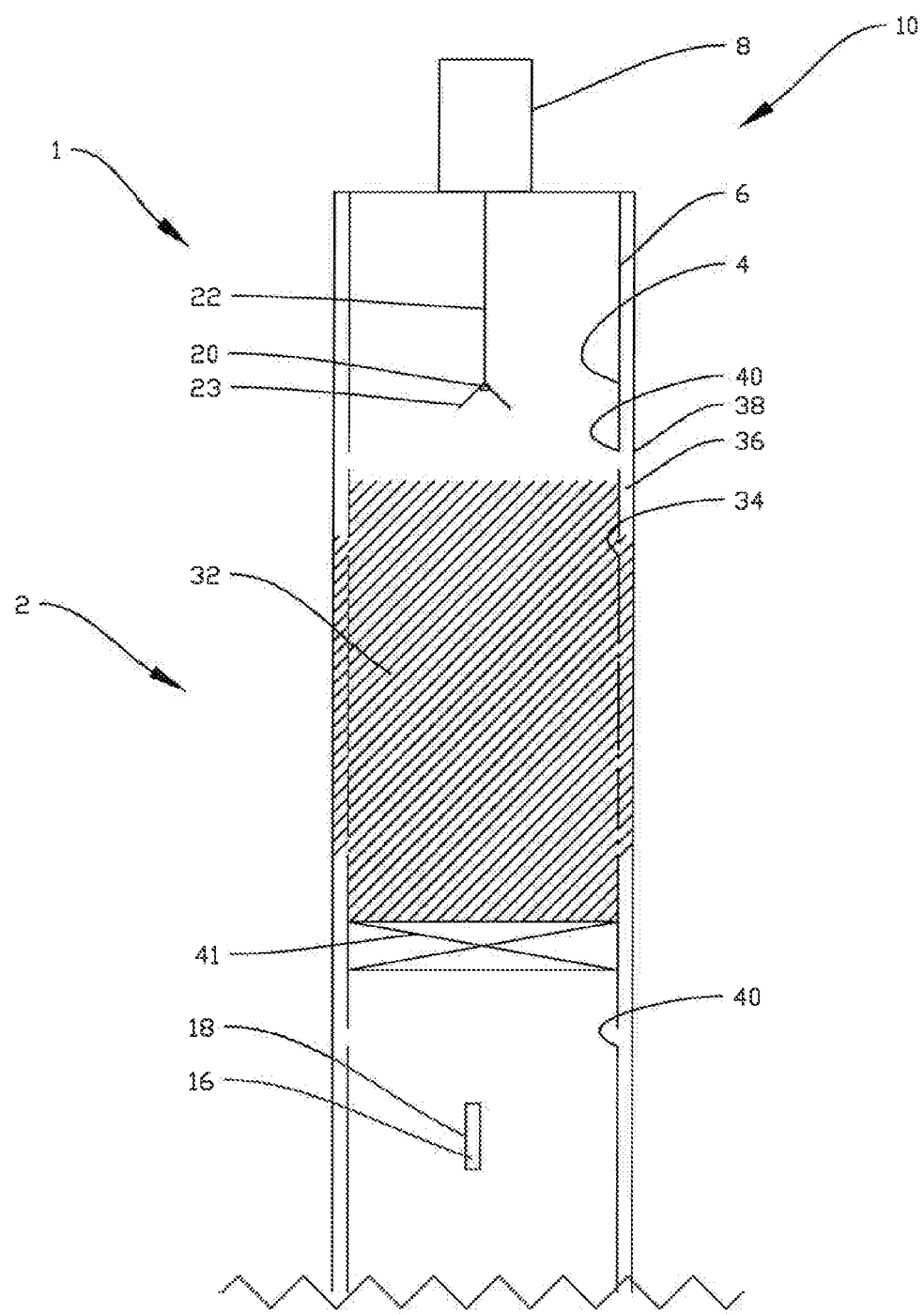
FIG. 8 shows a fifth embodiment of a system according to the fourth aspect of the disclosure.

FIG. 8 shows a fifth embodiment of a system 1 according to the fourth aspect of the present disclosure. The barrier 2 is constituted by a cement plug 32 (Perforate Wash and Cement—PWC) made by pre-perforation of the casing 6 and pre-washing of the perforations 34 and the annulus 36 between the casing 6 and the formation 38 before filling cement slurry into the wellbore including into the annulus 36 outside the perforations 34. The cement plug 32 uses a mechanical fundament 41 in the wellbore 4. The PWC technology is e.g. disclosed in the above-referenced WO 2012/096580 and will not be discussed in further detail herein. In this embodiment, additional perforations 40 are formed in the casing 6 above and below the cement plug 32, which also will enable verification of the integrity of the part of the cement plug 32 located in the annulus 36. In a similar, not shown embodiment, where the wellbore is only lined with a single casing and the surrounding formation is shale, the disclosure may also be used to test the barrier integrity of a so-called "creeping shale" seal around the casing. It has been shown that shale tends to creep against the wellbore over time so as to form a natural seal around the casing which may form an equally efficient sealing barrier compared to cement. A similar method as shown in FIG. 8 for PWC cement, may be used in a shale reservoir by perforating the casing above and below the zone with creeping shale to test the integrity of the shale barrier outside the casing in addition to testing the integrity of a barrier, typically a cement plug, placed centrally in the wellbore.

Figure 9:
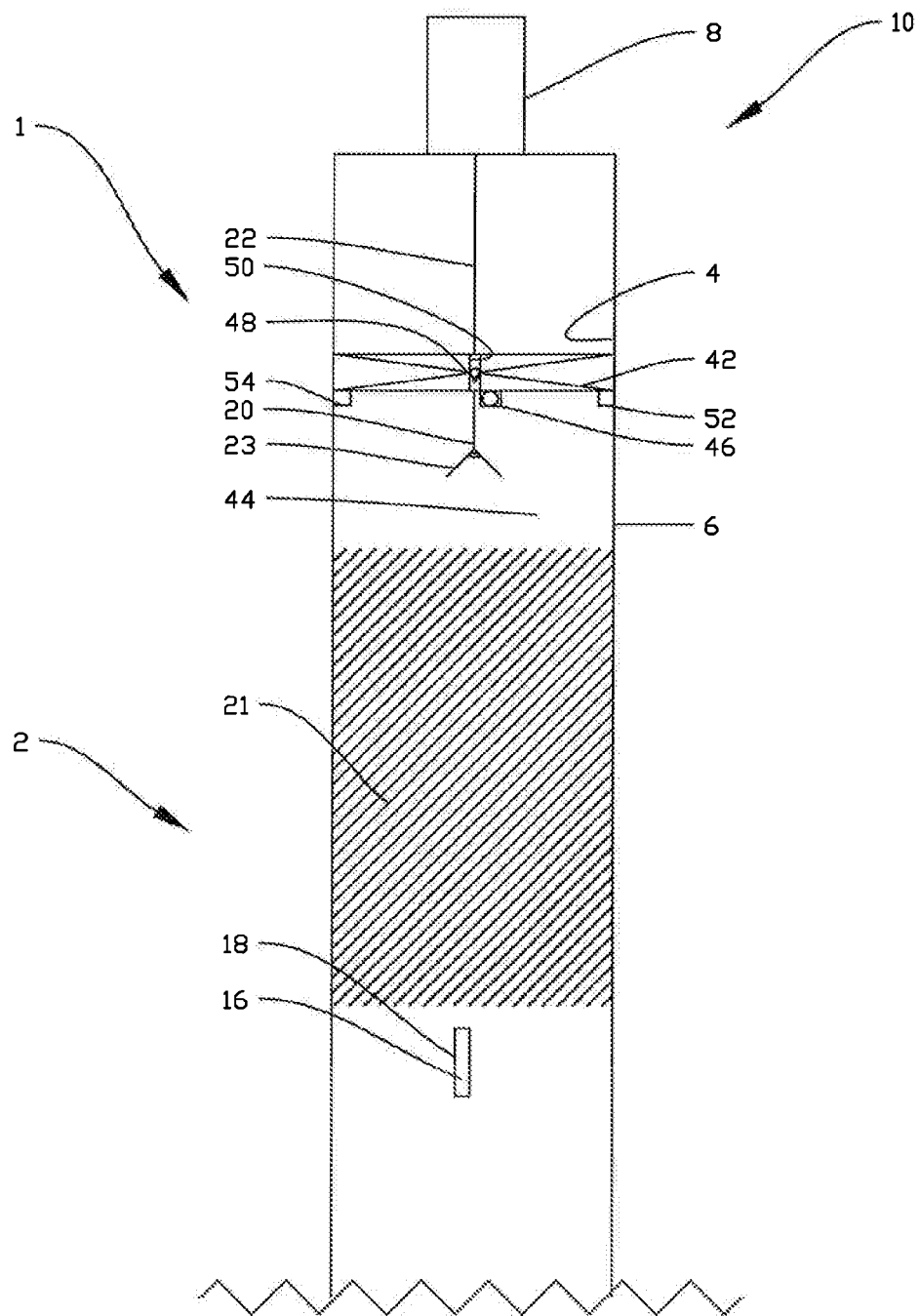
FIG. 9 shows a sixth embodiment of a system according to the fourth aspect of the disclosure.

FIG. 9 shows a sixth embodiment of a system 1 according to the fourth aspect of the present disclosure, wherein a second barrier 42, in the form of a resettable packer is set above the barrier 2, in the form of a cement plug 21, that is to be tested. The resettable packer 42 and the cement plug 21, together with the casing 6, forms an isolated volume 44 between them. Before releasing the tracer 16 from the canister 18, the pressure in the isolated volume 44 is reduced by pumping, by means of a pump 46, mud from the isolated volume 44 and to above the resettable packer 42 through a check-valve 48 in a through-bore 50 in the resettable packer 42. The resettable packer 42 is also provided with, on its side facing the isolated volume, a pressure sensor 52 and a temperature sensor 54. The pressure sensor 52 and temperature sensor 54 communicates with a not shown topside control unit through the wireline 22. In alternative embodiments, communication with the topside control unit may be established through drill pipe or coiled tubing. Locally reducing the pressure above the barrier 2 ensures a pressure gradient across the barrier 2 in the normal direction of fluid flow, which makes the leakage test more robust and reliable. In the shown embodiment, the detector 20 is suspended from below the resettable packer 42, while the resettable packer 42 itself is suspended from the wireline 22.

Figure 10:
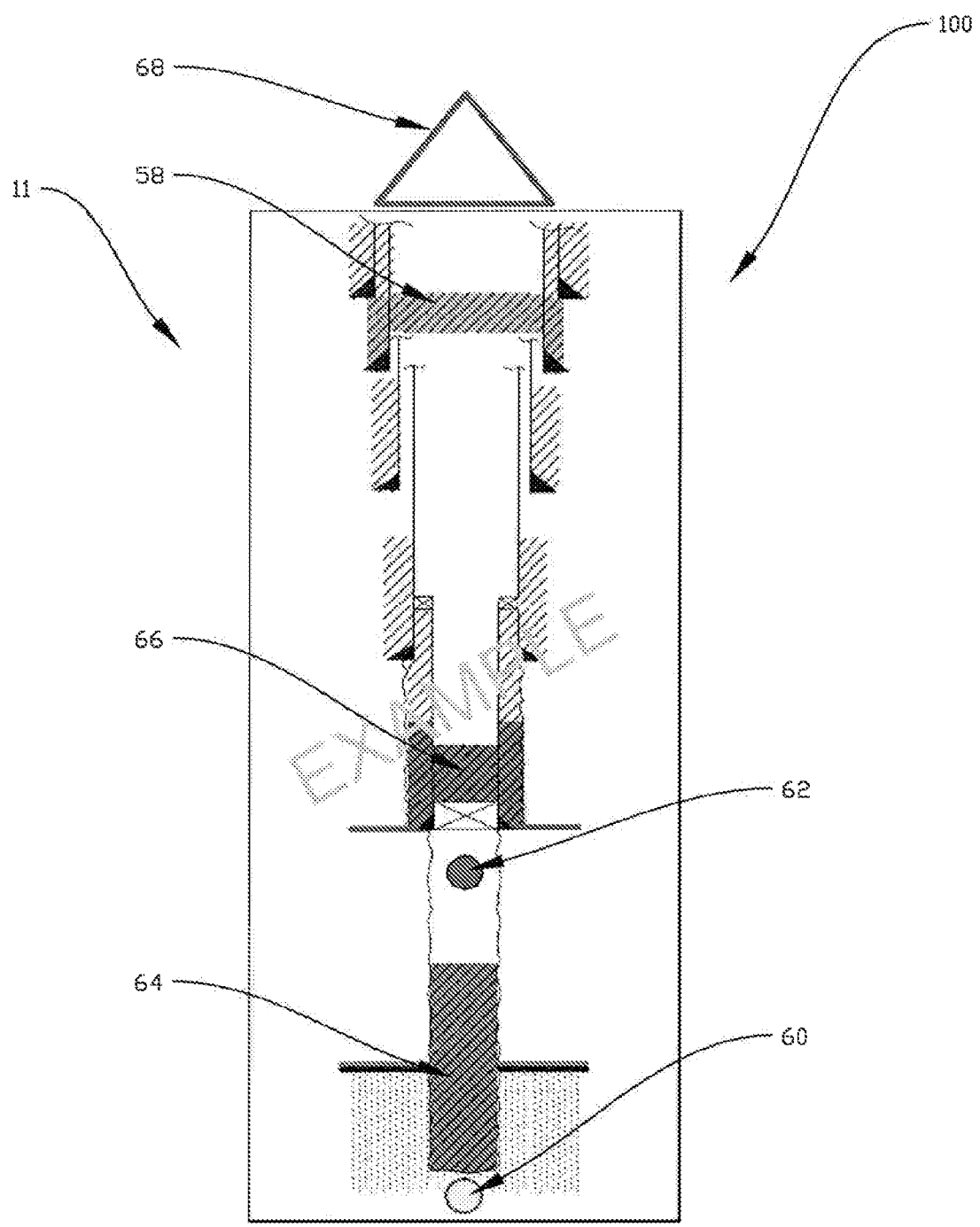
FIG. 10 shows an alternative embodiment of a system for the verification of the integrity of barrier in a well.

FIG. 10 shows an alternative system 11 for the verification of the integrity of a barrier in a permanently abandoned well 100, wherein the wellhead has been removed and replaced by a surface plug 58, thus serving as upper wellbore termination means. Two different tracers 60, 62 have been placed in the well below a primary barrier 64 and secondary barrier 66 respectively. A detector 68 is placed above the surface plug 58, the detector 68 being able to distinguish between the first tracer 60 and the second tracer 62. Detection of the first tracer 60 may be indicative of two compromised barriers whereas detection of only the second tracer may be indicative of a compromised second barrier.

Figure 11:
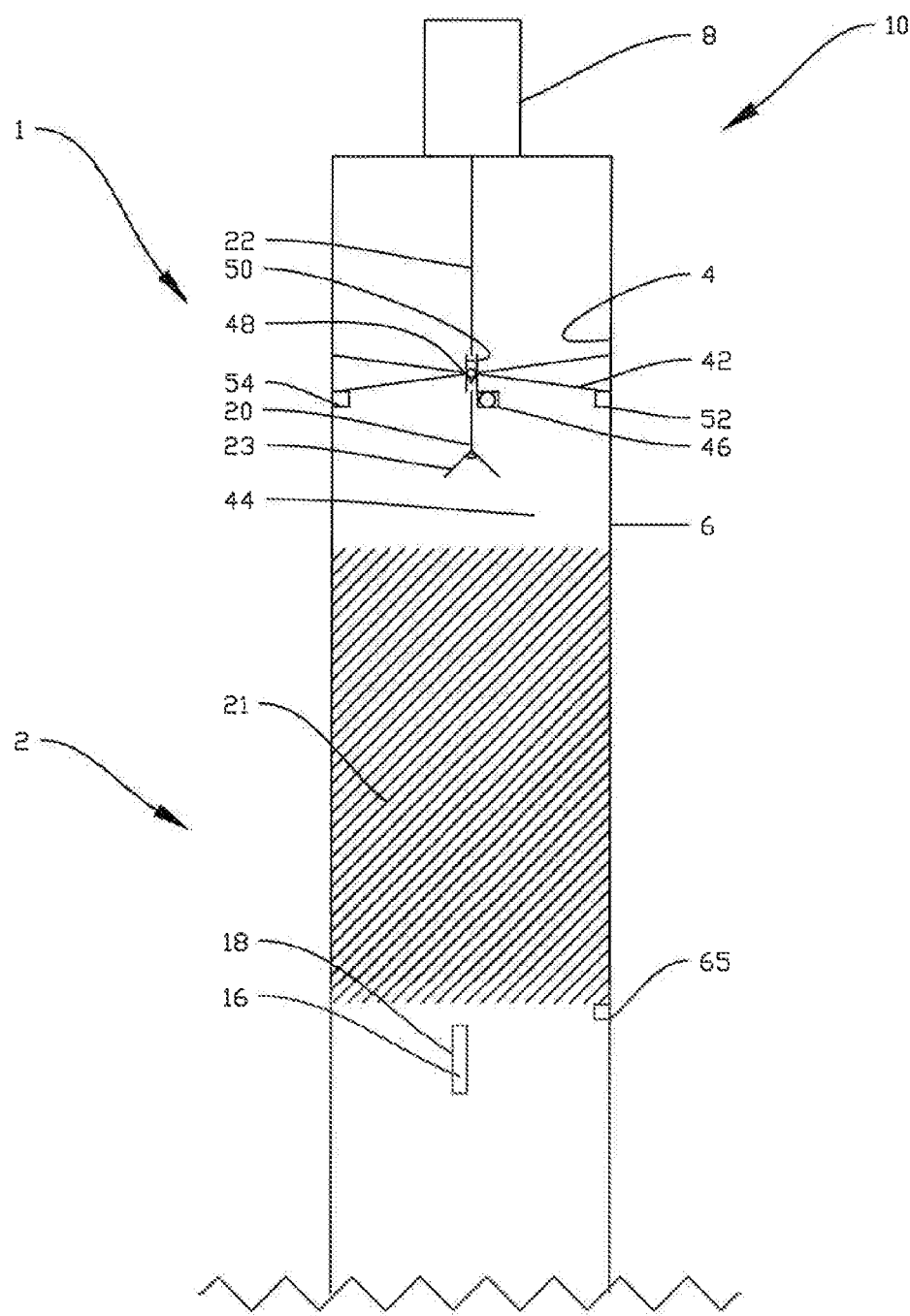
FIG. 11 shows a seventh embodiment of a system according to the fourth aspect of the disclosure.

FIG. 11 shows a seventh embodiment of a system 1 according to the fourth aspect of the present disclosure. The embodiment is similar to the sixth embodiment shown in FIG. 9, with the difference that the system 1 comprises an additional pressure sensor 65 provided below the barrier 2, here shown as a cement plug 21. The additional pressure sensor 65, together with the pressure sensor 52 above the cement plug 21, enables wireless monitoring of the pressure difference across the barrier 21. The wireless communication may be established with radio or acoustic signals. The pressure difference may also be the driving mechanism for driving tracer through the barrier 21, in addition to diffusion and buoyancy, and monitoring the pressure difference may be beneficial for obtaining a more complete understanding of the mechanism driving tracer through the barrier 21. It may also add information to quantify leak rates.

Figure 12:
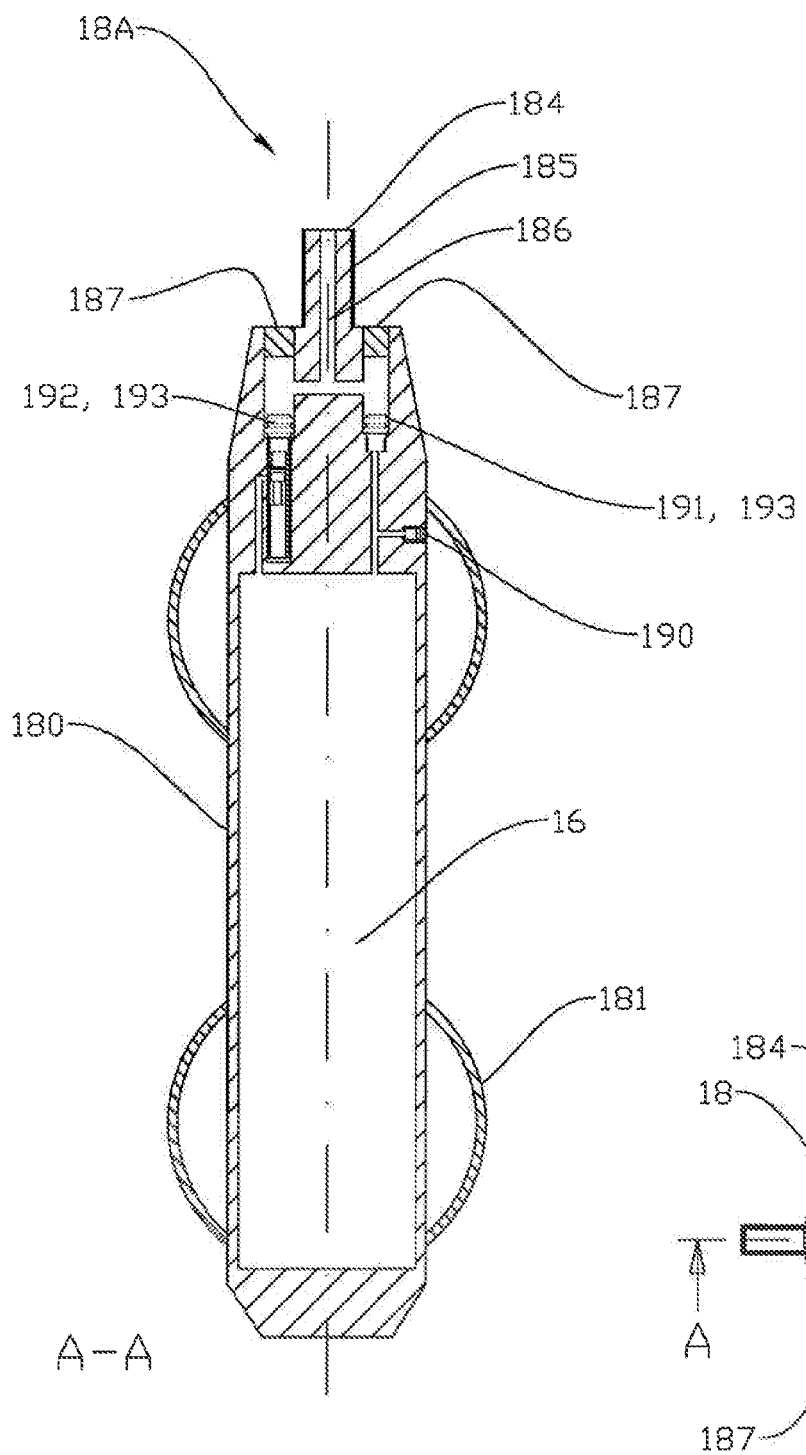
FIG. 12 shows, in a cross-sectional side view, a first embodiment of a canister according to the third aspect of the disclosure.
Figure 13:
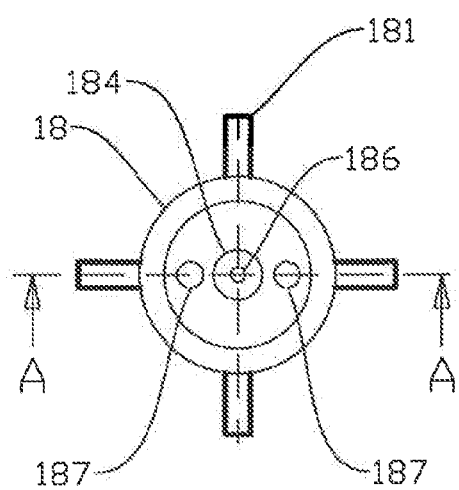
FIG. 13 shows the canister from FIG. 12 as seen from above.

FIG. 12 shows a canister 18A intended to be connected to the underside of a not shown bridge plug. At its upper (downstream) end the canister 18A is provided with a bridge connector 184 formed with external threads 185 fitting complementary with internal threads in a bore in the not shown bridge plug. The canister 18A is formed with a container 180 for storing tracer 16. Centralisers 181 are provided for keeping the canister 18A at a central position in the well 10. The tracer 16 is filled into the container 180 through a filling valve 190. Two different embodiments of a release mechanism are shown as examples in the figure; a dissolvable metal plug 191 that will dissolve over time in the well so that tracer 16 may be released from the canister 18A through tracer outlet 186, and a valve 192 operated by means of a not shown electronic controller. The rationale is to design a system with redundant functionality, that provides very high reliability. Normally, only one of the two release mechanisms will be present in one and the same canister 18A. Pressure sensors 193 are also provided in relation to both the dissolvable plug 191 and the controller-operated valve 192. Blind ports 187 ensure that tracer is only released through the centrally placed tracer outlet 186. FIG. 13 shows the canister from FIG. 12 as seen from above. An advantage of connecting the canister 18A to the underside of a bridge plug, is that standardized infrastructure, such as existing bridge plug running and pulling tools, may be used to place and retrieve the canister 18A into and from the well, respectively, together with a bridge plug. An existing bridge plug only needs to be modified in that it must be adapted to be connected to the canister 18A, and enable gas to flow through the plug to the topside. In this embodiment, where the canister 18A with tracer 16 pressurized in the container 180, the bridge plug needs to be provided with a bore in fluid communication with the tracer outlet 186 so that tracer can be released through the bridge plug into a closed space above the plug. The bore in the plug should preferably be provided with a one-way/check valve to ensure that tracer only flows from the canister 18A to the space above the plug.

Figure 14:
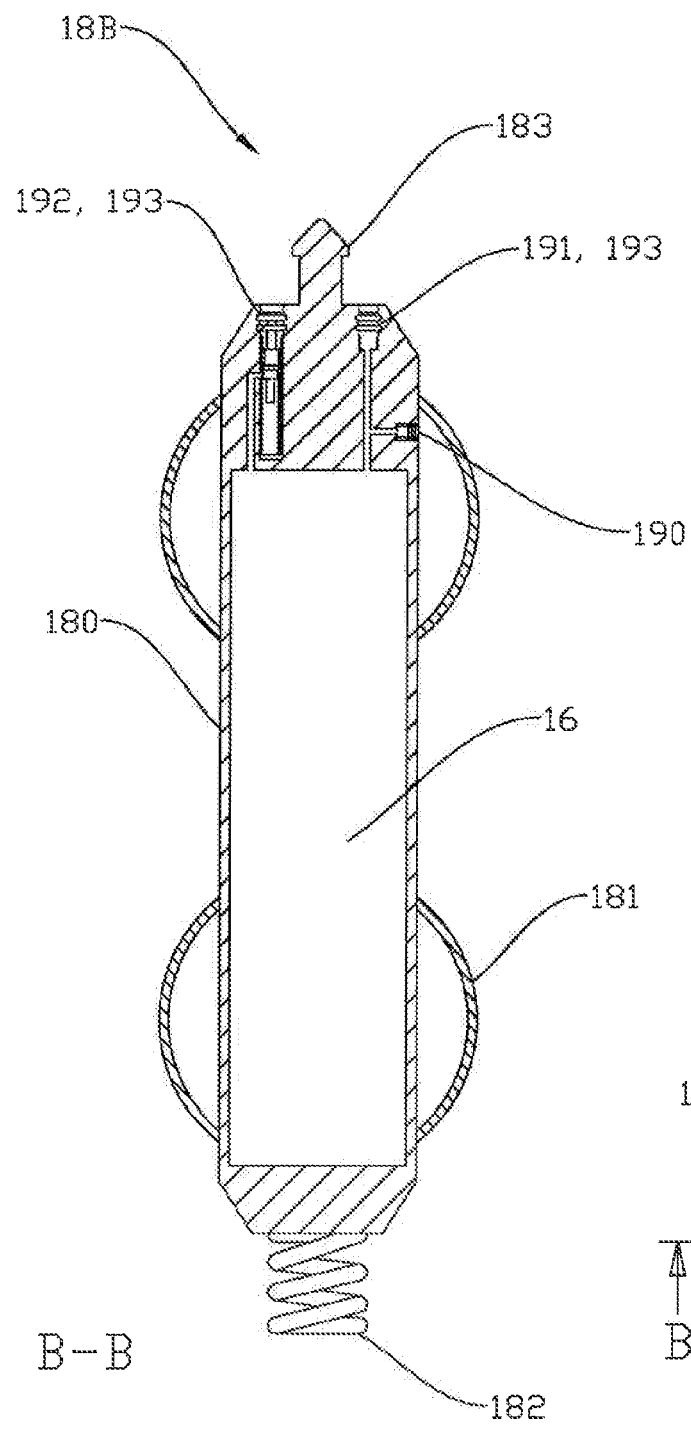
FIG. 14 shows, in a cross-sectional side view, a second embodiment of a canister according to the third aspect of the disclosure.
Figure 15:
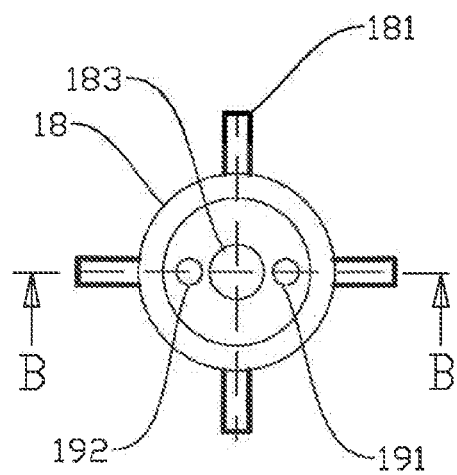
FIG. 15 shows the canister from FIG. 14 as seen from above.
Figure 16:
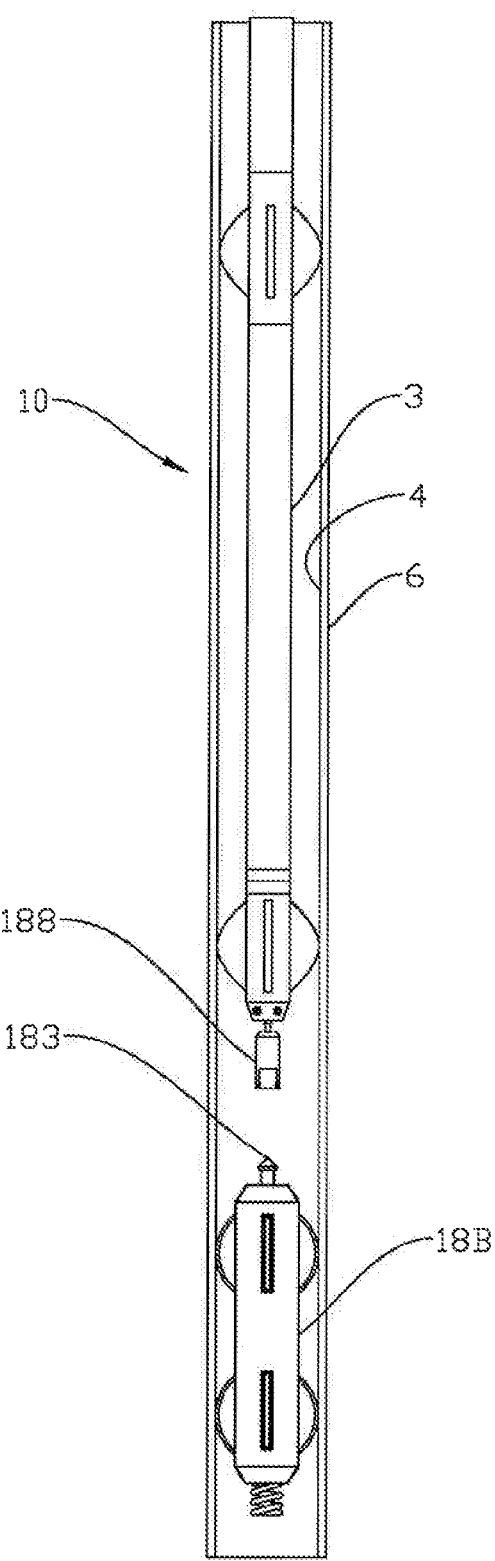
FIG. 16 shows the canister from FIG. 14 being set in a well.

In FIG. 14 a different embodiment of a canister 18B is shown. The canister 18B is intended to be placed on top of a bridge plug, or any other mechanical fundament, in the well. The canister is provided with a shock absorber 182, in the form of a spring, on its underside to reduce the impact on the mechanical fundament and the canister itself 18B when the canister 18B is landed on the mechanical fundament in the well 10. The canister 18B is formed with a fishing neck 183 for connection to a fishing tool 188, as can be seen in FIG. 16, for deployment of the canister 18 B in the well. The canister 18B is also provided with centralizers 181 and the same two release mechanisms as the canister 18A shown in FIGS. 12 and 13; a dissolvable metal plug 191 and a controller-operated valve 192, both provided with a pressure sensor 193. The release mechanisms could be other alternatives such as two independent electronically controlled, or one of them a mechanical clock. In normal use only one of these release mechanisms will normally be present. FIG. 15 shows the canister 18B from FIG. 14 as seen from above.

FIG. 16 shows the canister 18B from FIGS. 14 and 15 positioned in the well 10. A fluid-carrying string 3, here in the form of a drill string, is provided with a fishing tool 188 on its lower end. For illustrative purposes, the fishing tool 188 and the fishing neck 183 of the canister 18B are shown at a distance from each other. The fishing tool 188 may be of any type adapted to connect to and release from the bridge plug 30. In the shown embodiment, the fishing tool 188 is a so-called "overshot" or outside grappling device adapted to swallow the fishing neck 183 on the canister 18B for connection thereto.

Figure 17:
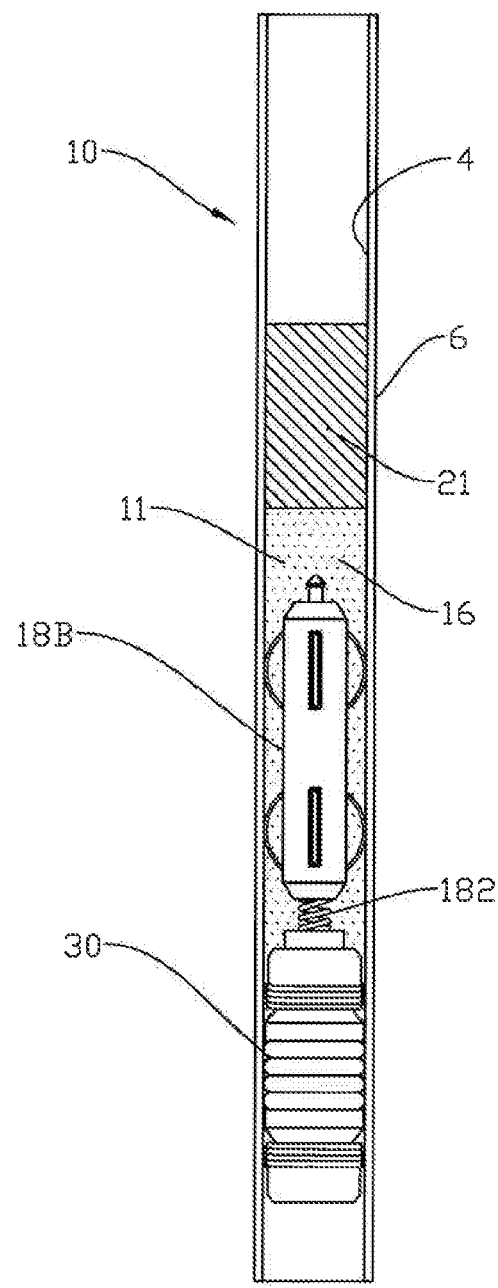
FIG. 17 shows the second canister from FIG. 14 provided above a bridge plug in a well.

In FIG. 17 the canister 18B is shown placed on a bridge plug 30 after a cement barrier 21 has been placed in the well. A closed space 11 is defined between the bridge plug, the cement barrier, and the casing 6, into which tracer 16 is release at high pressure to establish a pressure gradient across the cement barrier with an overpressure at the upstream side. The closed space 11 is useful for building up an overpressure on the upstream side of the barrier to create the desired pressure gradient that will assist in driving tracer 16 through the cement barrier 21 in case the barrier has become leaky. Not shown sensors/sniffers for detecting the tracer may be placed above the wellbore in the mud circulation or conditioning system as described in the first aspect of the disclosure and/or in the well above the cement barrier 21 below the wellbore termination means as described in the fourth aspect of the disclosure.

Figures 18, 19, 20:
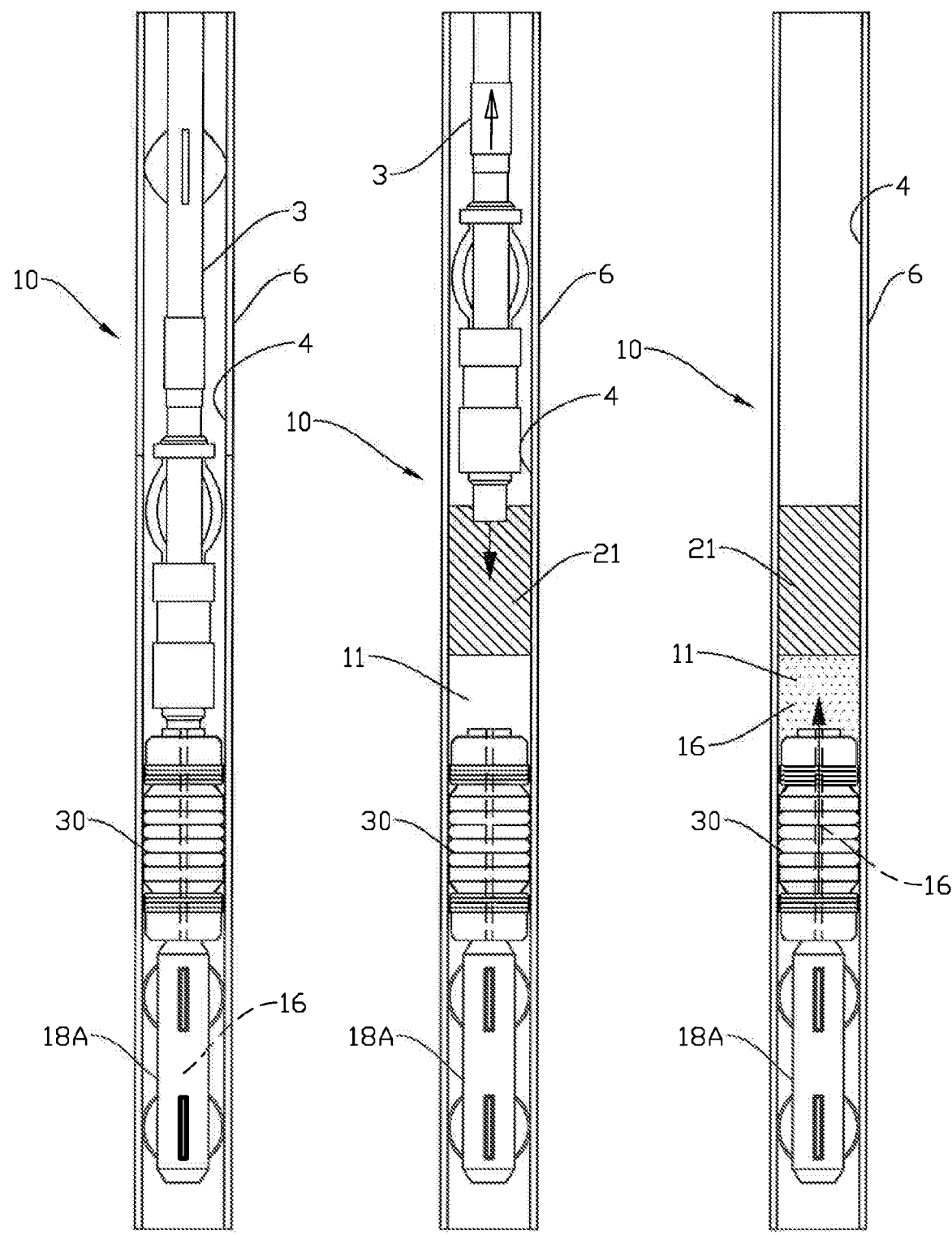
FIG. 18 shows the first canister from FIG. 12 and a bridge plug being set in a well.
FIG. 19 shows the canister and bridge plug from FIG. 18 during cementing of the well.
FIG. 20 shows the first canister and the bridge plug from FIG. 19 after the tracer has been released in the well.

FIG. 18, 19, 20 show the canister 18A from FIGS. 12 and 13 being placed in the well 10 together with a bridge plug 30 to which the canister 18A is connected on the upstream side as discussed above in relation to FIG. 12. FIG. 19 indicates the process of establishing a cement plug 21 above the bridge plug 30 by supplying a cement slurry through a fluid-carrying string 3. Cement is pumped down through the fluid-carrying string 3 while at the same time the fluid-carrying string 3 is pulled upwards as the volume therebelow is gradually filled with cement. A bore, indicated with dotted lines, extends axially through the bridge plug 30 from the upstream and to the downstream side thereof. The bore is in fluid communication with the tracer outlet 186 on the canister 18A as discussed above in relation to FIG. 12. In FIG. 20 the well 10 is shown after the string 3 has been pulled out and after the cement plug 21 has consolidated. Tracer 16 is being released from the canister 18A through the bore of the bridge plug and into the closed space 11 defined by the bridge plug 30, casing 6 and cement barrier 21. Not shown sensors/sniffers for detecting the tracer may be placed above the wellbore in the mud circulation or conditioning system as described in the first aspect of the disclosure and/or in the well above the cement barrier 21 below the wellbore termination means as described in the fourth aspect of the disclosure.

Figure 21:
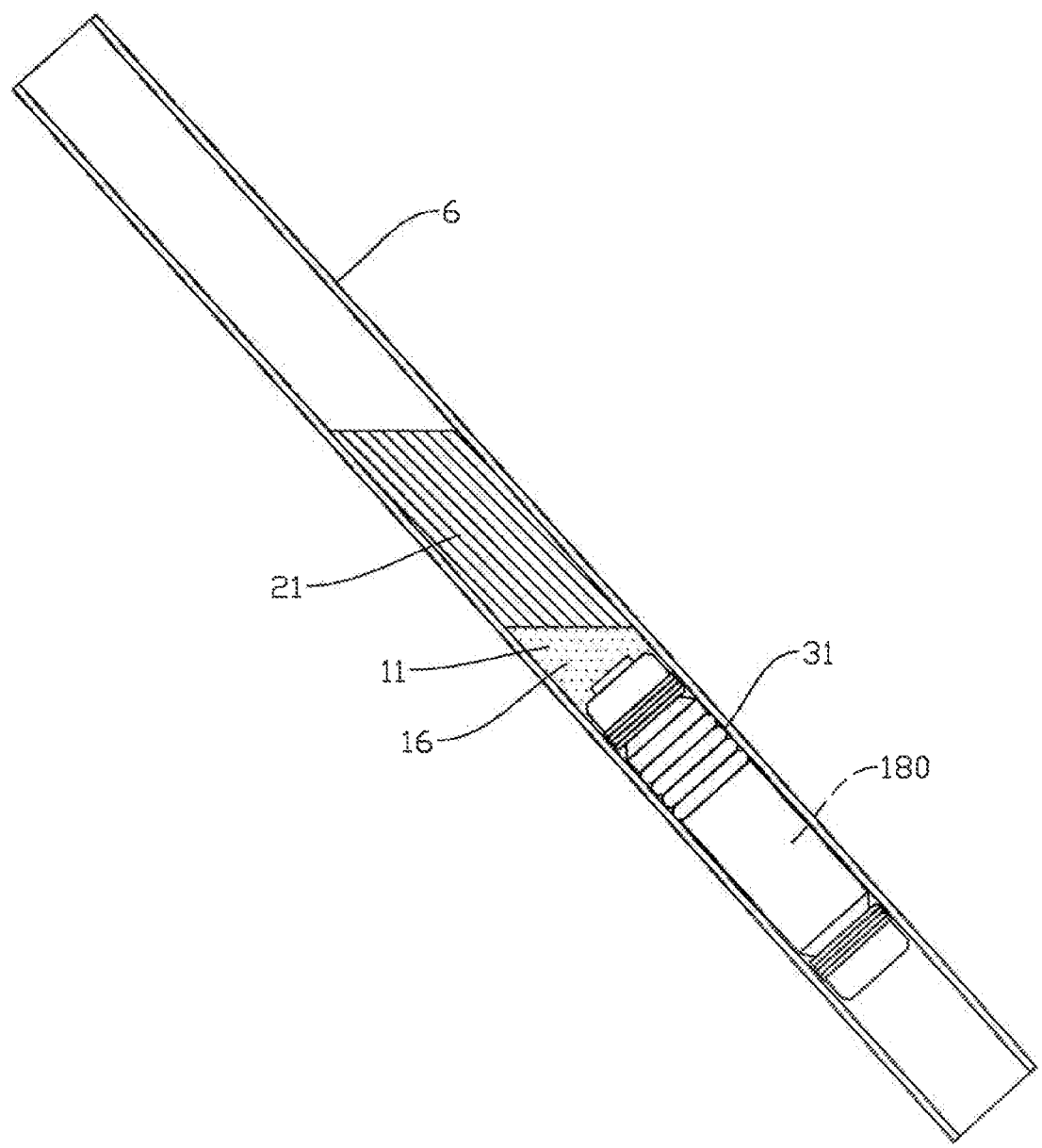
FIG. 21 shows a bridge plug with an integrated canister in a deviated well.

In FIG. 21 a bridge plug 31 provided with an integrated pressurized tracer container 180 is placed in a deviated well. In this embodiment, the bridge plug 31 is fully integrated with the bridge plug 31, and may be released from inside the bridge plug. Tracer 16 once again released to a closed space 11 defined by the bridge plug 31, the cement barrier 21 and the casing 6. Not shown sensors/sniffers for detecting the tracer may be placed above the wellbore in the mud circulation or conditioning system as described in the first aspect of the disclosure and/or in the well above the cement barrier 21 below the wellbore termination means as described in the fourth aspect of the disclosure.

It should be noted that the above-mentioned embodiments illustrate rather than limit the disclosure, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements.

The mere fact that certain measures are recited in mutually different dependent claims does not indicate that a combination of these measures cannot be used to advantage.

What is claimed is:

1. A system for testing of leaking past a well barrier, the system comprising:
    a well including a wellbore and an upper wellbore termination means;
    a barrier provided in the wellbore, the barrier having an upstream side below the barrier and a downstream side above the barrier;
    a tracer;
    a storage means for storing said tracer, the storage means being provided below the barrier in the well;
    a release mechanism for releasing the tracer from the storage means, wherein the system is configured to establish a pressure differential across the barrier by changing a pressure above and/or below the barrier via operating a pump, and/or reducing a pressure above the barrier, wherein the pressure differential is established for driving tracer from the upstream side to the downstream side of the barrier; and
    a detector for detecting the tracer that has leaked through the barrier, the detector being provided in the wellbore between said barrier and said upper wellbore termination means.

2. The system according to claim 1, wherein the upper wellbore termination means is a wellhead.

3. The system according to claim 1, wherein the detector is provided in the well-bore closer to the barrier than to the upper wellbore termination means.

4. The system according to claim 3, wherein the detector is provided in the well-bore at most 100 meters above the barrier or at most 10 meters above the barrier.

5. The system according to claim 1, wherein the detector is placed on the barrier.

6. The system according to claim 1, the system further comprising a guide for guiding the tracer towards the detector, the guide being shaped with a concentrating shape comprising a concentrating end and a broader opening, wherein an actively detecting part of the detector is placed at the concentrating end of the guide downstream of the broader opening.

7. The system according to claim 1, wherein the barrier comprises a thermite plug.

8. The system according to claim 1, wherein the barrier comprises a cement plug.

9. The system according to claim 1, wherein the detector is an integrated part of the barrier where the barrier is a mechanical barrier.

10. The system according to claim 1, wherein the tracer is an inert gas.

11. The system according to claim 1, wherein the tracer is at least one of a halogen, a halogen compound, H2 gas, H2 gas mixed with nitrogen, and a radioactive gas.

12. The system according to claim 1, wherein the system further comprises a control unit and a data transmitter for connecting said detector to said control unit.

13. The system according to claim 1, wherein the barrier is a first barrier, the system comprising a second barrier positioned in the well above the first barrier that is to be tested, wherein the first barrier and the second barrier prevent flow into and out of an isolated volume created therebetween, and wherein the pressure gradient is established such that a pressure within the isolated volume is less than a pressure below the first barrier.

14. The system according to claim 13, wherein the detector is suspended from the second barrier so as to be placed in the isolated volume.

15. A system for testing of leaking past a well barrier, the system comprising:
- a well including a wellbore and an upper wellbore termination means;
- a first barrier provided in the wellbore, the first barrier having an upstream side below the first barrier and a downstream side above the first barrier;
- a second barrier positioned in the well below the first barrier that is to be tested, wherein the first barrier and the second barrier prevent flow into and out of an isolated volume created therebetween;
- a tracer;
- a storage means for storing said tracer, the storage means being provided at least below the first barrier in the well;
- a release mechanism for releasing the tracer from the storage means, wherein the system is configured to establish a pressure differential across the first barrier by increasing a pressure in the isolated volume by operating the release mechanism and/or operating a pump, wherein the pressure gradient is established such that a pressure within the isolated volume is greater than a pressure above the first barrier, and wherein the pressure differential is established for driving tracer from the upstream side to the downstream side of the first barrier; and
- a detector for detecting the tracer that has leaked through the first barrier, the detector being provided in the wellbore downstream of the first barrier.

16. The system according to claim 15, the system comprising a pressure sensor provided in connection with the isolated volume.

17. A method for testing of leaking past a barrier in a well by means of a system comprising:
- a well including a wellbore and an upper wellbore termination means;
- a first barrier provided in the wellbore, the first barrier having an upstream side below the first barrier and a downstream side above the first barrier;
- a tracer;
- a storage means for storing said tracer, the storage means being provided below the first barrier in the well;
- a release mechanism for releasing the tracer from the storage means; and
- a detector for detecting the tracer that has leaked through the first barrier, the detector being provided in the wellbore between the first barrier and the upper wellbore termination means, the method comprising the steps of:
- lowering the detector into the well;
- releasing the tracer from below the first barrier;
- establishing a pressure gradient across the first barrier by reducing a pressure above the first barrier, and/or providing a second barrier in the wellbore below the first barrier and increasing a pressure in an isolated volume between the first barrier and the second barrier, wherein the pressure gradient is established for driving the tracer from the upstream side to the downstream side of the first barrier; and
- monitoring a concentration of the tracer by the detector.

18. A method according to claim 17, wherein the pressure gradient is established across the first barrier by reducing the pressure above the first barrier such that the pressure above the first barrier is less than a pressure below the first barrier.

19. A method according to claim 17, wherein the tracer is pressurized and the pressure gradient across the first barrier is established by releasing the pressurized tracer from the storage means into the isolated volume between the first barrier and the second barrier.

20. A method according to any of the claim 17, wherein the method further comprises the step of tagging the barrier in the well before releasing the tracer.

\* \* \* \* \*